(12) United States Patent
Beshai et al.

(10) Patent No.: US 6,486,983 B1
(45) Date of Patent: Nov. 26, 2002

(54) AGILE OPTICAL-CORE DISTRIBUTED PACKET SWITCH

(75) Inventors: Maged E. Beshai, Stittsville (CA); Richard Vickers, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/475,139

(22) Filed: Dec. 30, 1999

(51) Int. Cl.⁷ .............................................. H04J 14/00
(52) U.S. Cl. ...................... 359/117; 359/139; 370/355; 370/356
(58) Field of Search ................. 359/139, 117, 359/128; 370/355–356

(56) References Cited

U.S. PATENT DOCUMENTS

| | | | | |
|---|---|---|---|---|
| 4,894,818 A | * | 1/1990 | Fujioka et al. ................. 370/3 |
| 5,091,905 A | * | 2/1992 | Amada ......................... 370/60 |
| 5,455,701 A | * | 10/1995 | Eng et al. .................... 350/135 |
| 5,469,284 A | * | 11/1995 | Haas .......................... 359/139 |
| 5,475,679 A | | 12/1995 | Munter ....................... 370/58.2 |
| 5,734,486 A | * | 3/1998 | Guillemot et al. ........... 359/139 |
| 5,754,320 A | | 5/1998 | Watanabe et al. ............ 359/117 |

* cited by examiner

Primary Examiner—Kinfe-Michael Negash
(74) Attorney, Agent, or Firm—Max R. Wood; Ogilvy Renault

(57) ABSTRACT

A self-configuring distributed switch has agile core modules connected by a plurality of channels to a plurality of large capacity edge modules. A core module controller selects paths through an associated core module and reconfigures the paths in response to dynamic changes in data traffic loads. Switching latency in the core modules is masked so that the source edge modules need not disrupt data transmission during reconfiguration. Surplus capacity is provided in the core modules to facilitate reconfiguration. Connection release and connection setup policies increase occupancy variance among the space switches in each core module to further facilitate reconfiguration. The reconfiguration functions of the data switch modules and the core modules are coordinated to keep reconfiguration guard time minimized. The advantage is a high capacity, load-adaptive, self-configuring switch that can be geographically distributed to serve a large geographical area.

48 Claims, 14 Drawing Sheets

AGILE OPTICAL-CORE DISTRIBUTED PACKET SWITCH

TECHNICAL FIELD

This invention relates generally to high-capacity data switches. In particular, the invention relates to a self-configuring distributed packet switch with an agile optical core that adapts to variations in data traffic loads in a switched data network, and has a large switching capacity.

BACKGROUND OF THE INVENTION

The volume of data now exchanged through telecommunications networks requires data networks having a large capacity for data transfer. Such networks must also serve large geographical areas. Network scalability to achieve a very large capacity and wide-area coverage may be achieved by increasing the number of nodes in a network and/or increasing the transfer capacity per node. For a given link capacity, e.g., 10 Gb/s, increasing the capacity per node necessitates increasing the number of links per node. In a balanced network, the mean number of hops per node pair is inversely proportional to the number of links per node. Decreasing the mean number of hops per node pair dramatically reduces network-control complexity, facilitates routing functions, and enables network-wide quality of service (QOS) objectives.

Very high-capacity switches are required in order to decrease the number of hops per node pair in a network. Consequently, methods for constructing very high-capacity switches are desirable. It is also desirable to distribute such switches to permit switch access modules to be located in proximity of data traffic sources.

Advances in optical switching technology have greatly facilitated the construction of high-capacity switches using optical space switches in the switch core. The principal problem encountered in constructing high-capacity switches, however, is the complexity of coordinating the transfer of data between ingress and egress, while permitting the creation of new paths between the ingress and the egress as traffic patterns fluctuate. Consequently, there exists a need for a method of increasing data transfer capacity while simplifying data transfer control in a high-speed data switch.

The design of data switching systems has been extensively reported in the literature. Several design alternatives have been described. Switches of moderate capacity are preferably based on a common-buffer design. For higher capacity switches, the buffer-space-buffer switch and the linked-buffers switch have gained widespread acceptance. A switch based on an optical space-switched core is described in U.S. Pat. No. 5,475,679, which issued on Dec. 12, 1995 to Munter. An optical-core switching system is described in U.S. Pat. No. 5,575,320, which issued May 19, 1998 to Watanabe et al.

A buffer-space-buffer switch, also called a space-core switch, typically consists of a memoryless fabric connecting a number of ingress modules to a number of egress modules. The ingress and egress modules are usually physically paired, and an ingress/egress module pair often shares a common payload memory. An ingress/egress module pair that shares a common payload memory is hereafter referred to as an edge module. The memoryless fabric is preferably adapted to permit reconfiguration of the inlet-outlet paths within a predefined transient time. The memoryless core is completely unaware of the content of data streams that it switches. The core reconfiguration is effected by either a centralized or a distributed controller in response to spatial and temporal fluctuations in the traffic loads at the ingress modules.

The linked-buffers switch includes sets of electronic ingress modules, middle modules, and egress modules, and has been described extensively in the prior art. Each module is adapted to store data packets and forward the data packets toward their respective destinations. The module-sets are connected in parallel using internal links of fixed capacity.

A disadvantage of the switching architectures described above is their limited scalability. A scalable switch architecture with an optical core is described in Applicant's co-pending United States Patent Application entitled SELF-CONFIGURING DISTRIBUTED SWITCH which was filed on Apr. 6, 1999 and assigned Ser. No. 09/286,431, the specification of which is incorporated herein by reference.

While the self-configuring packet switch described in Applicant's co-pending application represents a significant advance in high speed switching technology, because of the currently available switching speeds of known optical switches, tandem switching is required to adapt the switch to data traffic fluctuations. The disadvantages of tandem switching with respect to control complexity and inefficient use of resources are well known. There therefore exists a need for an agile optical-core distributed packet switch that can rapidly adapt to fluctuations in data traffic loads so that reliance on tandem switch paths is reduced.

Packet transfer delay between an ingress edge module and an egress edge module in a distributed switch includes a propagation delay and a queuing delay at the ingress edge module. The core modules are memoryless and, hence, do not contribute to the packet transfer delay. However, the delay in space-switching a connection in the core requires that the ingress edge modules using a switched connection pause for a predetermined time interval before transferring data over the switched connection. If the space-switching delay is relatively long, being for example of the order of a millisecond, then an affected ingress edge module operating at a high speed may have to buffer a large amount of data during each core reconfiguration interval.

There therefore exists a need for a method of overcoming the switching latency problem without having to provision edge modules with very large buffer capacity.

OBJECTS OF THE INVENTION

It is an object of the invention to provide a very high-capacity switch with a channel-switching core having multiple independent optical switching core modules.

It is another object of the invention to provide a method of reconfiguring the core of a packet switch having distributed edge modules and distributed optical switching core modules.

It is yet another object of the invention to provide a self-configuring switch with optical switching core modules that adjusts its internal inter-module connections in response to fluctuations in data traffic volumes.

It is yet a further object of the invention to provide a data switch with an optical switching modular core in which channel switching and connection routing are fully coordinated.

It is another object of the invention to develop a self-configuring switch with a distributed optical switching core that circumvents core-switching latency.

SUMMARY OF THE INVENTION

The invention therefore provides an agile optical-core distributed packet switch, comprising a plurality of slow-switching core modules, each of the core modules including a plurality of optical space switches. The core modules are connected to a plurality of fast-switching edge modules by a number of inner channels. The fast-switching edge modules are also connected to subtending packet sources and subtending packet sinks by a number of outer channels. A controller is associated with each core module. The controller instructs the fast-switching edge modules to switch from unused inner channels to respective new inner channels reconfigured in the core module, thereby masking switching latency of the slow-switching core modules without interrupting data transfer from the source edge-modules.

The invention further provides a method of channel switching data packet streams received on inner links from fast-switching edge modules using optical space switches in a core module of a geographically distributed packet switch. The method comprises the steps of using uncommitted connections in the optical space switches to configure new connections in the optical space switches in response to reconfiguration requests received from the fast-switching edge modules, and instructing the fast-switching edge modules to switch from unused inner channels to the new connections reconfigured in the core module, without interrupting data transfer from the source edge-modules.

The core is reconfigured in response to reconfiguration requests sent from the edge modules. The reconfiguration requests are based on data traffic volumes.

The steps of reconfiguration include:

(1) traffic monitoring at ingress edge modules;
(2) communication of traffic data to core modules;
(3) selecting the space switches from which unused connections are to be released and the space switches through which new connections are to be established;
(4) timing the rearrangement of the space switches and source-module links; and
(5) reconfiguration at the ingress edge modules according to instructions received from core module controllers.

Each ingress edge module monitors its spatial traffic distribution and determines its capacity requirement to each egress edge module, each connection being defined in units of a full channel capacity. The channel capacity is indivisible. An ingress edge module generates a table that indicates the preferred core module for a channel to each egress edge module. The method of generating the table is based on topology information. An edge module selects a preferred core module and communicates with the selected core module to request the ingress/egress capacity reallocation. Each core module aggregates all the connectivity-change requests from all ingress edge modules and periodically implements a reconfiguration procedure. The outcome of such a procedure is a list of new connections for one or more of its space switches. Entries in the list that correspond to each ingress edge module are communicated accordingly. The edge modules perform their own reconfiguration procedure, when required. The timing coordination among the ingress edge modules and the core modules is governed by a scheme described in Applicant's co-pending U.S. patent application Ser. No. 09/286,431, which is incorporated by reference.

In order to distribute the computational effort at the edge modules, the core modules stagger their reconfiguration implementation so that only one of the core modules is reconfigured at a time. The core modules reconfigure in a round robin discipline. A sufficient time period is allowed for each reconfiguration. Once a core module has completed its reconfiguration task, if any, it sends a message to a next core module permitting it to proceed with the reconfiguration process. Such a message is not required if a core module uses its full reconfiguration-time allocation. The timing process is preferably enabled by the collocation of a selected edge module with each core module.

DEFINITION OF TERMS

Figure 1:
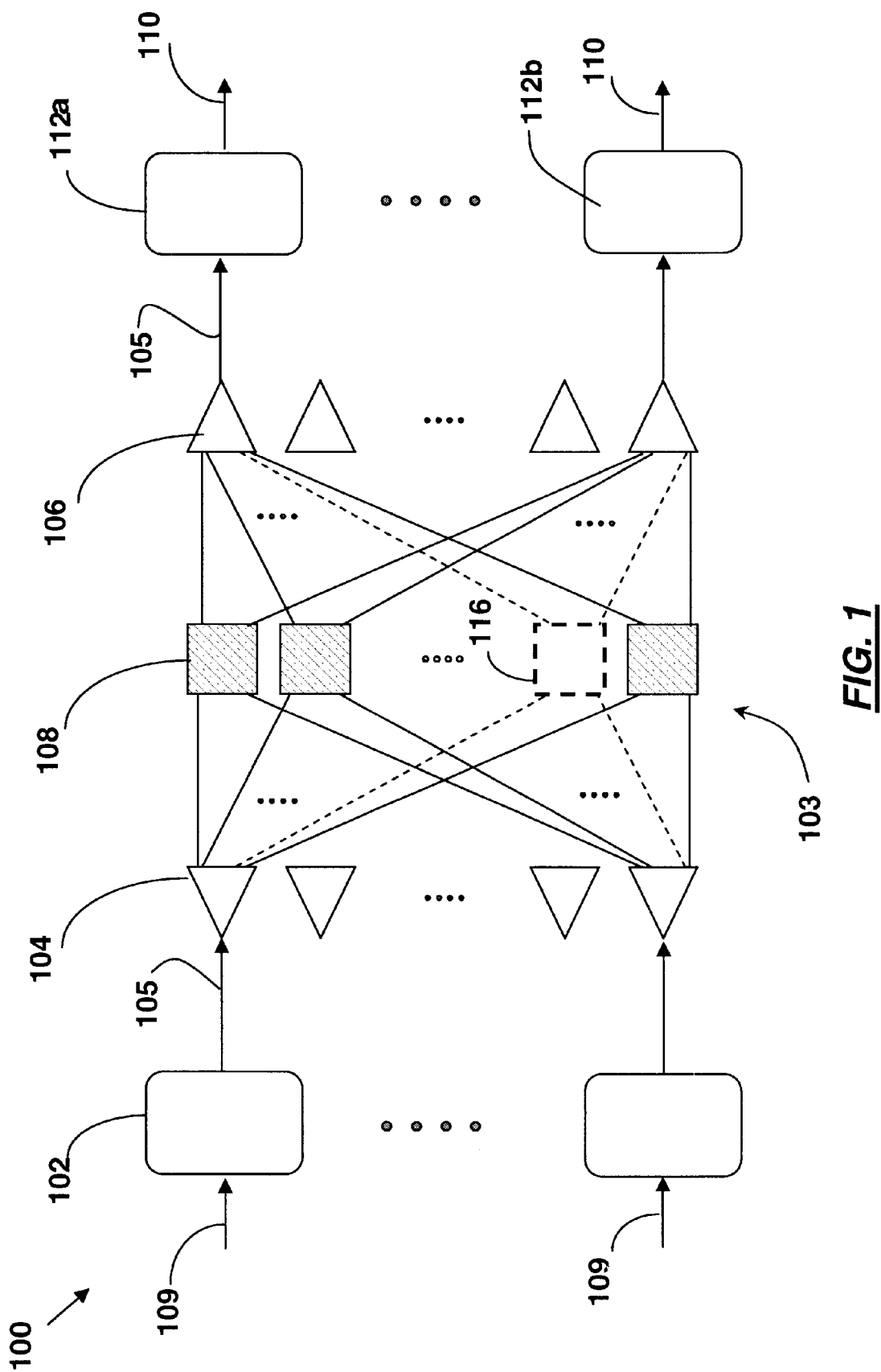
FIG. 1 is a schematic diagram showing the architecture of a generic switch comprising ingress edge modules, an optical switching core having multiple parallel space switches, and sink edge modules.

Inner channel: A channel from an ingress edge module to a core module or a channel from a care module to an egress edge module.

Outer channel: An incoming channel to an ingress edge module or an outgoing channel from an egress edge module.

Inner capacity: The number of inner channels of an ingress edge module or an egress edge module.

Outer capacity: The number of outer channels of an ingress edge module or an egress edge module.

Connection: A path from an ingress edge module to an egress edge module, the path including two concatenated channels. A channel is not divisible and may correspond to a wave-length in a wave division multiplexed (WDM) network.

Committed connection: A connection between an ingress edge module and an egress edge module with capacity reserved by admission-control (whether user or network initiated).

Connection reconfiguration: Replacement of a connection between an ingress edge module and an egress edge module by a connection from the ingress edge module to another egress edge module.

Released connection: A connection that is no longer required by an ingress edge module, as identified in a reconfiguration request.

Target connection: A connection identified in a reconfiguration request, as a replacement for a connection that is no longer required.

Uncommitted connection: A connection between an ingress edge module and an egress edge module that is assigned by the network, without admission-control interference, but can be gracefully released by instructing a sending ingress edge module to discontinue sending data through the connection.

Protected traffic: Traffic that uses committed connections.

Unprotected traffic: Traffic that uses uncommitted connections and, possibly, committed connections at an uncommitted rate.

Active port: A port (input or output) in a space switch that is part of a committed connection.

Idle port: A port (input or output) in a space switch that is part of an uncommitted connection. Any idle input port and idle output port on the same core switch can form an uncommitted connection.

Space switch occupancy: The number of active ports in a space switch.

Space-switch vacancy: The number of idle ports in a space switch.

Permutation: A permutation is any set of N connections in an N×N switch.

Reconfiguration-request array: An array sent by an edge module to a core module indicating desirable connectivity changes. A first entry in the array is the number of changes required. The first entry is followed by a number of segments equal to the number of the requested changes. A segment has three fields: an identifier of a sending ingress edge module, an identifier of a current egress edge module, and an identifier of the desired egress edge module.

Release and connection space switch: A reconfiguration process releases a connection between an ingress edge module and an egress edge module from a release space switch and replaces it with a connection between the same ingress edge module and a different egress edge module through a connection space switch.

Release array: An array constructed at a core module controller using the reconfiguration-request arrays received from the ingress edge modules. The array contains data related to released connections.

Connection array: An array constructed at a core module from the reconfiguration-request arrays received from the ingress edge modules. The array contains data related to redirected connections.

Connectivity matrix: A matrix of N rows and M columns, N being the number of edge modules and M the number of space switches in a core module. An entry in the matrix at row j and column k indicates the output port to which input port j is connected in space switch k.

Connectivity array: A column in the connectivity matrix is referred to as a connectivity array. A connectivity array is associated with a specific space switch, and the $j^{th}$ entry in the array is the identifier of an output port to which input port of identifier j is connected. A connectivity array {a, b, c, d} indicates that input "0" is connected to output "a", input "1" is connected to output "b" and so on.

Space-switch-occupancy array: An array of M entries indicating the number of idle input ports in respective space switches in a core module.

Space-switch pointer array: An array of M entries, each entry containing an identifier of a space switch in a core module, with successive entries having space switch identifiers sorted according to the occupancy of corresponding space switches.

Packing list: A list for storing an order in which space switches in a core module are to be considered for reconfigured connections. The list includes a number of divisions equal to the number of space switches to be reconfigured. A first entry in the list contains the number of divisions. The divisions are generally of unequal length. Each division has a number of segments that indicate the new connections to be effected. The first field in a division indicates the number of segments in the division. The segments are of equal length, each containing four fields identifying, respectively, a space-switch input port, a space-switch output port, current space-switch and new space switch.

Space-switch packing: A space switch having an idle input port x and an idle output port y is packed by migrating a connection between input port x and output port y from another space switch in the same core module supporting the same connection.

Congruence level: The number of equivalent entries in two connectivity arrays is the congruence level of the respective space switches in a core module. For example if the connectivity array of two 8×8 space switches are {1, 4, 7, 2, 5, 6, 3, 0} and {1, 4, 7, 3, 5, 6, 0, 2}, then their congruence level is 5. This is the number of congruent connections in the two space switches. Respective entries in the connectivity arrays are considered equivalent if either of the two entries is a null entry, representing an uncommitted connection. Thus, connectivity arrays {1, 4, 7, 2, 5, 8, 3, 0} and {1, 8, 7, 3, 5, 6, 0, 2}, where the number 8 represents a null entry (an uncommitted connection), also have a congruence level of 5. (The number 8 is used to identify a null entry since the input or output ports of a space switch are numbered as 0 to 7 in this example.)

Fast switching: The ability of a switch to reconnect an input to a specified output in a relatively short period of time, for example, in a few nanoseconds. The distinction between fast and slow switching is subjective. A switch may be considered slow if the product of the input-port data transfer rate and the interval of time required to switch an input port to a new output port is large, e.g., of the order of 10,000 bytes.

Fast reconfiguration: Frequent core reconfiguration with a relatively short interval between successive reconfiguration processes, for example every 10 milliseconds.

DETAILED DESCRIPTION OF THE PREFERRED EMBODIMENTS

Figure 2:
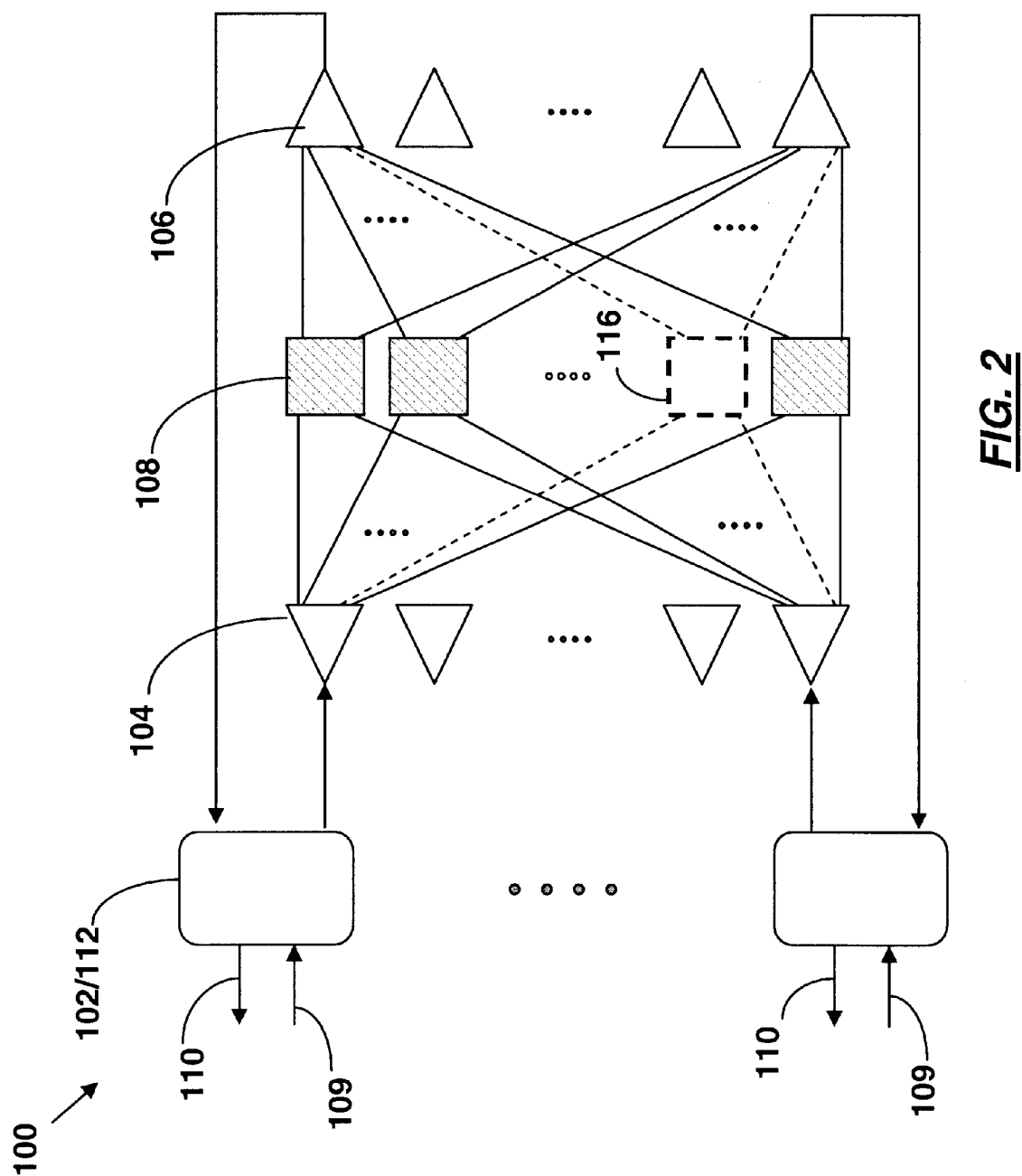
FIG. 2 is a schematic diagram showing the switch architecture illustrated in FIG. 1, but with the source and sink edge modules paired to share integrated source-sink edge modules.

A packet switch 100 that includes a plurality of electronic edge modules 102, 112 and an optical core module 103 is schematically illustrated in FIG. 1. Each electronic edge module switches variable-sized packets. An edge module is commonly a dual module that comprises an ingress edge module 102, for connecting data packet sources 109 to the optical core and an egress edge module 112 for connecting the optical core to data packet sinks 110. The source and sink edge modules are not necessarily symmetrical; they may have different outer capacities. A folded configuration of the packet switch shown in FIG. 1, in which source and sink edge modules 102, 112 are paired to share common memories is illustrated in FIG. 2.

Figure 3:
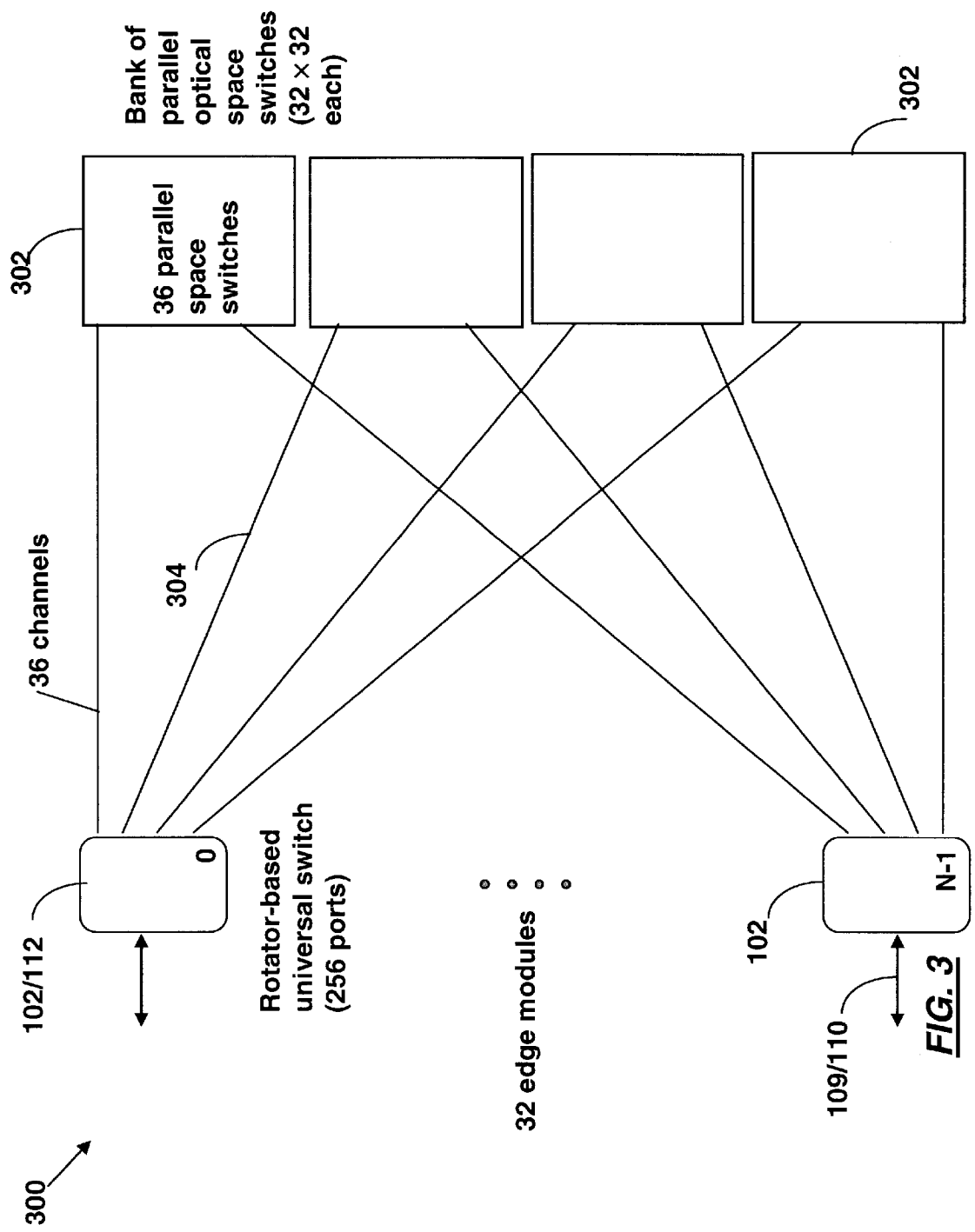
FIG. 3 is a schematic diagram of a switch derived from the architecture shown in FIG. 1, with the core being partitioned into a number of independent core modules.

The optical core module 103 may be divided into a number of distributed core modules 302 in a distributed switch, illustrated in FIG. 3. The electronic edge modules 102, 112 and the optical core modules 302 may be located in widely separated areas.

Generic Architecture

The distributed switch 300 includes N>1 electronic ingress/egress edge modules 102 and a number, C, of core modules 302. Each core module 302 includes a number of space switches. The core modules 302 need not necessarily include the same number of space switches. All the space switches (not shown) have the same number, N1, of input ports and output ports. The total number, L, of space switches in all the modules in the core equals the number of inner channels of each edge module 102.

Distributed Architecture

In the example shown in FIG. 3, there are 144 parallel space switches (L=144), each being a 32×32 space switch (N1=32), yielding a total inner capacity of 4608 ports (144×32). In the example of FIG. 3 there is an expansion factor of 144:112. The expansion is required to facilitate reconfiguration. The 144 space switches are grouped into 4 core modules of identical size, each core module including 36 space switches. Each edge module 102 is connected to each of the M space switches in a core module 302. A reconfiguration of the connections through the core modules 302 is periodically undertaken to respond to fluctuations in traffic volumes.

When reconfiguration of a core module 302 is complete, new connections are established and the edge modules 102 start to transmit data through the new connections and refrain from transmitting data through released connections. Since there is no buffering in the core, the switching of connections at the ingress edge modules 102 must be time-coordinated to coincide with reconfiguration of the core module 302. This requires that control and timing circuitry be provided at the core modules 302. A preferred arrangement for providing the control and timing circuitry is to collocate an edge module 102 with each of the core modules 302 and to use the collocated edge-module's controllers to handle the timing coordination.

Figure 4:
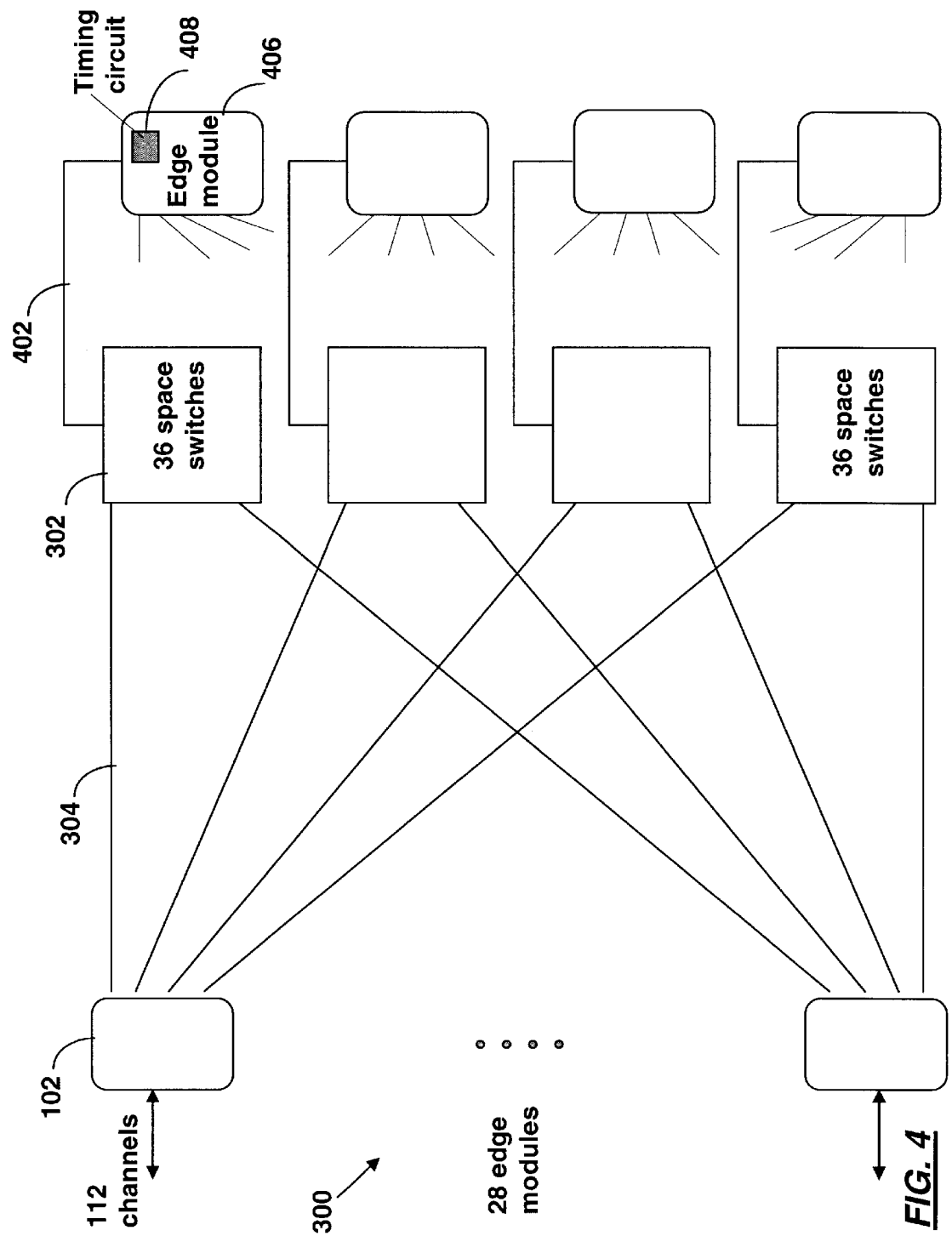
FIG. 4 is a schematic diagram showing an association of collocated source and sink edge modules, with respective core modules as illustrated in the switch architecture shown in FIG. 3.

This arrangement is illustrated in FIG. 4 which shows the association of collocated edge modules 406 with core modules 302. As noted above, the core modules may be of unequal size, i.e. the core modules 302 may respectively include a different number of space switches. The space switches in each core module 302 are preferably identical, and each core module includes at least two space switches. The number of space switches in a core module may differ from one core module to another. For example, in a switch having ingress edge modules with 280 inner channels (and the same number of inner channels in each egress edge module), the four core modules may have 80, 64, 96, and 40 space switches, and the edge module's inner channels would be distributed accordingly. Non-uniformity in the sizes of the core modules 302 is one way to accommodate spatial traffic distributions.

Core Reconfiguration

Figure 5:
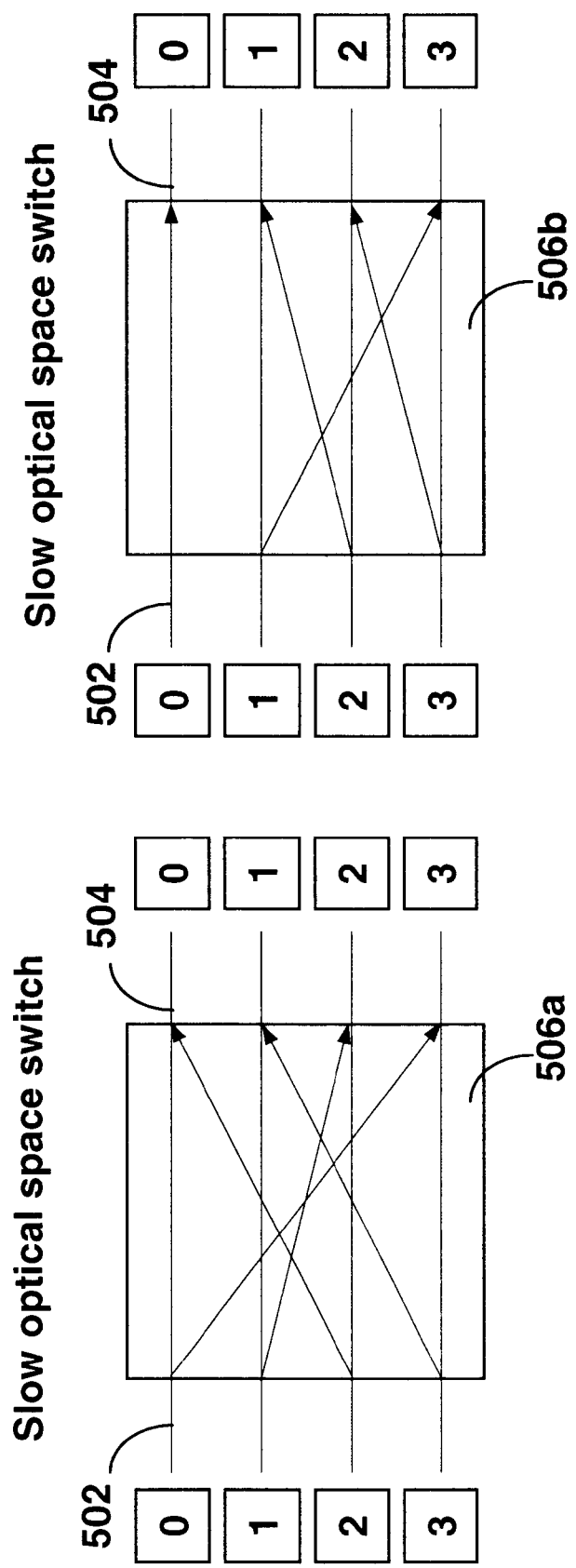
FIG. 5 is a schematic diagram illustrating a reconfiguration process in a core module that includes only one space switch.

FIG. 5 illustrates a reconfiguration of a single 4×4 space switch 506, where inputs 502 {0, 1, 2, 3} are reconfigured so that they are connected to outputs 504 {0, 3, 1, 2} instead of outputs {3, 2, 0, 1}. If the switching latency of space switch 506a is high, several milliseconds for example, the reconfiguration may result in a high buffer occupancy at one or more of the ingress edge modules 102 delivering data through the optical core (FIG. 4). This problem can be avoided by configuring a parallel, idle space switch 506b with the desired connection pattern and then switching to the idle space switch 506b by redirecting data packet traffic from the edge modules 102 to the reconfigured connections on space switch 506b. The released space switch 506a thereafter becomes an idle space switch ready for a next reconfiguration. This approach forms the basis of the reconfiguration method according to an embodiment. However, it is emphasized that the use of an idle space switch 506a, b for each active space switch 506a, b that is to be reconfigured is not economically viable since it results in a 50% core-capacity waste. Instead, a spare space switch 506b may be used to facilitate the reconfiguration of several other space switches 506a, one at a time. A method of reconfiguring a multi-switch core using a small number of idle core switches is described below.

An ingress edge 102 module may have two or more connections to an egress edge module 112. The connections between the ingress edge module 102 and the egress edge module 112 are preferably routed through different space switches 103 of the same core module 302, so that each route has the same propagation delay. When an ingress edge module controller determines that a reduction in the number of connections between itself and the egress edge module is appropriate because of a decrease in data traffic, it can release any of the connections. The selection of the connection to be released is crucial to the entire reconfiguration process, as will be described below in some detail.

The high-capacity switch 100 shown in FIGS. 1 and 2 employs a large number of parallel space switches in the core. A few of the space switches may be used as idle switches for facilitating switching at the required rate to avoid excessive buffering and packet delay in the ingress edge modules 102. However, with parallel space switches, the connections to be released may be threaded through different space switches, and their release might not yield a spare space switch. The invention therefore provides a method for organizing the reconfiguration process by selecting the space switch from which a connection is released so that idle connections are consolidated in a small number of space switches. The benefit of idle connection consolidation will become apparent from the description that follows.

Reconfiguration in Different Space Switches

When an ingress edge module 102 requests the replacement of a connection to an egress edge module 112a for a connection to an egress edge module 112b (FIG. 1), releasing the first connection and establishing the second connection subsequently can only be done if the switching delay in the core is negligible. If the switching delay in the core is high, the second connection must be configured before the connection change is performed. It is therefore necessary to establish a connection from the ingress edge module 102 to the new egress edge module 112b while preserving the connection from the ingress edge module 102 to the egress edge module 112a. After the connection with the egress edge module 112b is established, the ingress edge module 102 can reconfigure to use the connection to the egress edge module 112b, and cease use of the connection to egress edge module 112a.

Consolidation of-Idle Connections

Regardless of the utilization of the outer channels of the packet switch 100, each of the edge modules 102, 112 has at least D idle channels to each core module. D is preferably a small integer. With D=1, a core module having sixteen 8×8 space switches for example (M=16, N=8), would have 8 idle connections. If the 8 idle connections are threaded through 8 different space switches, the probability of successful assignment of a new reconfiguration request would be very low. If, on the other hand, the 8 idle connections are in one (vacant) space switch, then any permutation of the possible reconfiguration pattern can be accommodated. If k connections are released from a space switch, the number of new connections that can be accommodated in the same space switch is k×(k−1). If k=1, the space switch can not accept a new connection except for the connection that was just released, which is of no current interest. If k=2, two new connections can be added, if k=8, the number of possible new configurations is 56 and any 8 out of 56 possible new connections can be established.

To begin a reconfiguration process, reconfiguration requests received from the ingress edge modules 102 are sorted into a release array 560 (FIG. 6) and a connection array 580. Each entry in array 560 has three fields 562, 564, and 566 that respectively store identifiers of an ingress edge module, an egress edge module, and a release space switch. Each entry in array 580 has three fields 581, 582, and 584 the respectively store identifiers of a ingress edge module, a egress edge module, and a space switch to be used for a new connection. The release space switch 566 and the connection space switch 584 result from a procedure described below.

Arrays 560, 580 are used to organize the releases and the new connections in such a way as to increase the vacancy discrepancy among the core space switches 103 (FIG. 1). This is accomplished by a most advantageous selection of the release switches. As described above, vacancy consolidation increases the opportunity of establishing new connections. A release list 642 and a connection list 652 (FIG. 7) result from a reconfiguration process. The release list 642 contains a first entry 644 indicating the number of releases. The first entry 644 is followed by a number of segments 645 equal to the number of releases. Each segment 645 includes three fields: an identifier 647 of an ingress edge module, an identifier 648 of an egress edge module, and an identifier 649 of the space switch from which the connection is to be released.

A connection array 652 has a first entry 654 indicating a sum of the number of connection requests, and a number of unsuccessful connection attempts accumulated from previous reconfiguration cycles. Following the first entry 654 are a plurality of segments 655 as indicated in entry 654. Each segment 655 includes an identifier 657 of an ingress edge module, an identifier 968 of an egress edge module, and an identifier 659 indicating the space switch that will accommodate the new connection, determined using a process that will be described below. The construction of arrays 642 and 652 is the outcome of the reconfiguration computation.

Conventional Connection Packing: Single Releases vs. Batch Releases

In the conventional packing process used to reduce call blocking in circuit-switched networks, a switching node scans all the paths between an input port and an output port until a free path is located. The scanning process always starts with a designated reference path and proceeds to examine the subsequent paths in a given order. The release and connection processes are separate events. In accordance with the present invention, the release and connection processes are conducted in batches in order to maximize the opportunity of successful reconfiguration. Batch processing affords the opportunity of advantageous trade-off of free channels when a connection can choose from two or more available routes. Furthermore, in one embodiment, both the releases and connections are implemented in an iterative way that selects the space switch 103 to be reconfigured by comparing a space switch connectivity array (to be explained below with reference to FIG. 8) with the reconfiguration requests received from the ingress edge modules 102. The process therefore selects the connections to be released, whereas in ordinary circuit-switching operations, the connection to be released is determined by a network user, not the switch controller.

Reconfiguration Methods

With reference once more to FIG. 6, each ingress edge module 102 communicates a reconfiguration request array 522 to a selected core module 302. The reconfiguration request array 522 lists connection changes required to accommodate fluctuations in data traffic. The first entry 524 contains the number of connection changes requested. Each connection change is specified in subsequent segments 526. Each segment 526 includes three fields: the identifier 532 of the requesting edge module; the identifier 534 of the current egress edge module to which the ingress edge module is connected; and, the identifier 536 of the egress edge module to which the ingress edge module requires a connection. The reconfiguration request lists 522 received by each core module controller 406 (FIG. 4) are aggregated in a release list 560, and a connection list 580.

A first method of core reconfiguration uses a fixed-pattern packing process, while a second method uses an adaptive-pattern packing process. Both the first and second methods use batch packing. Two variations of each process are described, one for a fast switching core, and one for a slow switching core.

Fixed-pattern Packing

In each core module 302, connections are assigned starting from a reference space switch and proceeding in a predetermined order to the other space switches. Connection releases proceed in exactly the opposite order. Without loss of generality, the space switches of a core module 302 may be labeled as 0 to M-1. Connection assignment can start from space-switch 0 and proceed in a sequential order to space switches 1, 2, . . . , to M-1 where the cycle automatically repeats. The release process starts from space switch M-1 and proceeds in sequential order to M-2, M-3, . . . to space switch 0, where the release cycle automatically repeats.

(1) Fast Core Switching

If the switching delay in the core modules is negligible, the release list 642 (FIG. 7) is executed first followed by the connection list 652. When the release list 642 is executed first, each released connection is assigned a state of "10", indicating a connection just released. When the connection list 652 is executed, the new connections are assigned a state of "01", indicating a connection just established.

(2) Slow Core Switching

If the switching delay in the core modules is high, the connection list 652 is executed first, followed by the execution of the release list 642. The connection-then-release order is required to avoid the need for a respective source edge module to interrupt data transfer during a reconfiguration procedure. A new connection in response to a reconfiguration request must use an optical space switch other than the optical space switch supporting a respective connection to be released.

Adaptive-pattern Packing

Figure 8:
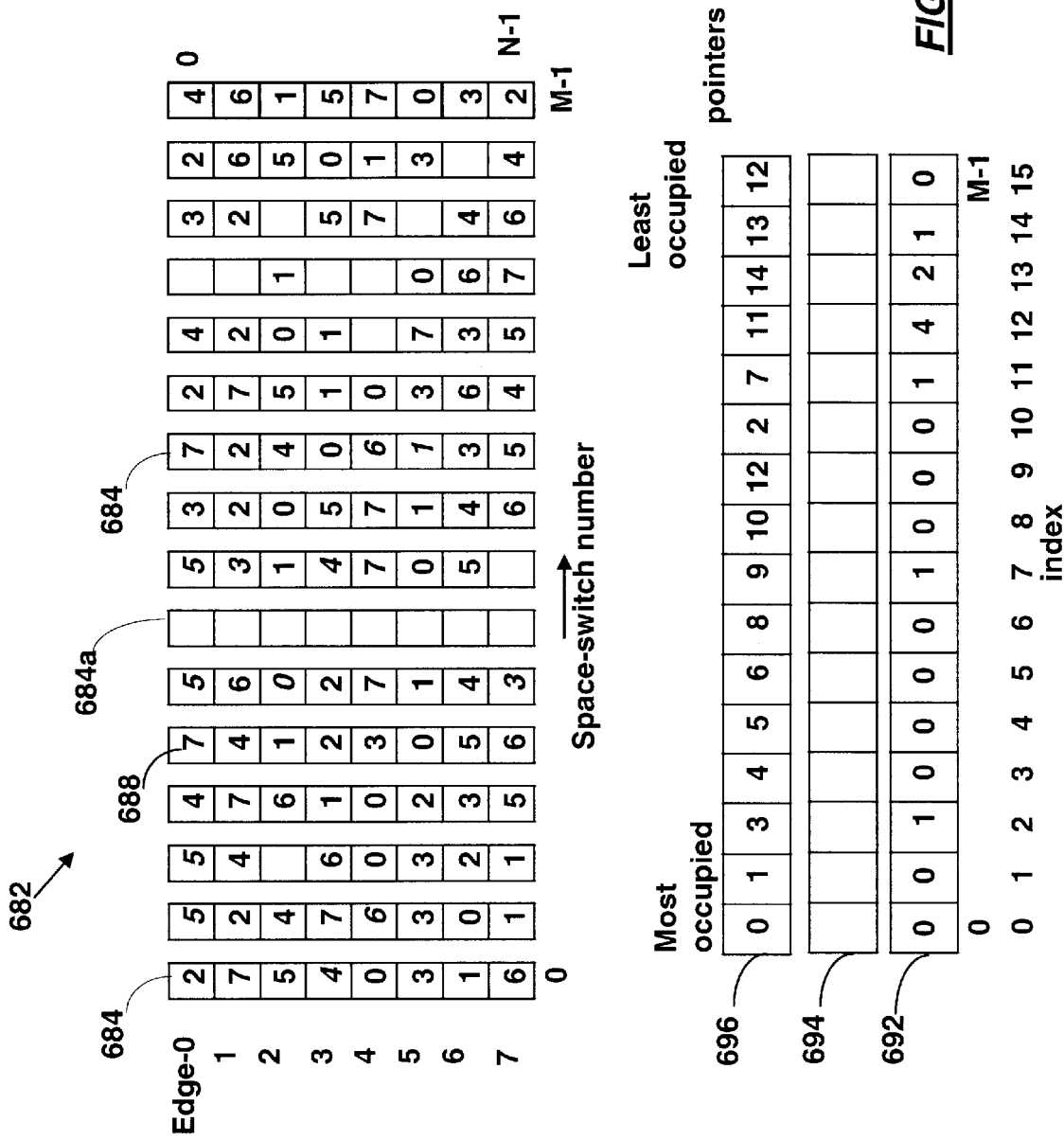
FIG. 8 is a schematic diagram of a data structure used by a core controller to determine connectivity-pattern changes for the purpose of reconfiguration of connections in the core module.

FIG. 8 shows a data structure 682 for tracking the connectivity of the M space switches 103 in a core module 302 to determine the reconfiguration of the core module. In a core module 302 comprising M space switches 103, the space switches are preferably labeled as C to M-1. An array 684 of N entries is associated with each space switch, N being the number of ingress edge modules 102. The array 684 indicates the connectivity of a respective space switch 103. For example, in space switch 0, ingress module 0 is connected to egress module 2, ingress module 1 is connected to egress module 7, and so on. Array 684a is associated with a completely-vacant space switch in this example.

Each entry 688 in the connectivity array 684 has two fields. The first field in each entry in the array 684 is the output port number to which the corresponding input port in a respective space switch is connected. A null entry in the first field indicates that input port j is idle. The second field is two bits wide (not illustrated) and is used to indicate the state of a connection specified by the value of the first field. The two bits permit the storage of three state indicators, "00", "01" and "10". The state indicators may be used to facilitate connection re-packing by enabling connection status to be recorded and recognized. A state of "00" indicates an idle connection; a state of "01", indicates a connection just established; and, a state of "10", indicates a connection just released. The re-packing process is not used in this disclosure.

The number (count) of uncommitted connections in each space switch is recorded in array 692. Array 694 is used as a work array that is accumulated into a pointer for facilitating the selection of a sequential order for reconfiguring the space switches. Array 696 stores the space switch identifiers, sorted in an ascending order according to the vacancy of the respective space switches. The vacancy of a space switch is represented by the number of its idle output ports or, equivalently, the number of uncommitted connections. In the case of multicast, the number of active output ports exceeds the number of active input ports.

A connection reconfiguration may be viewed as a release of a connection, followed by a request for a new connection to a different egress edge module 112. Array 560 (FIG. 6) shows a set of released connections and array 580 shows a set of requested new connections.

The Release Process

Figure 6:
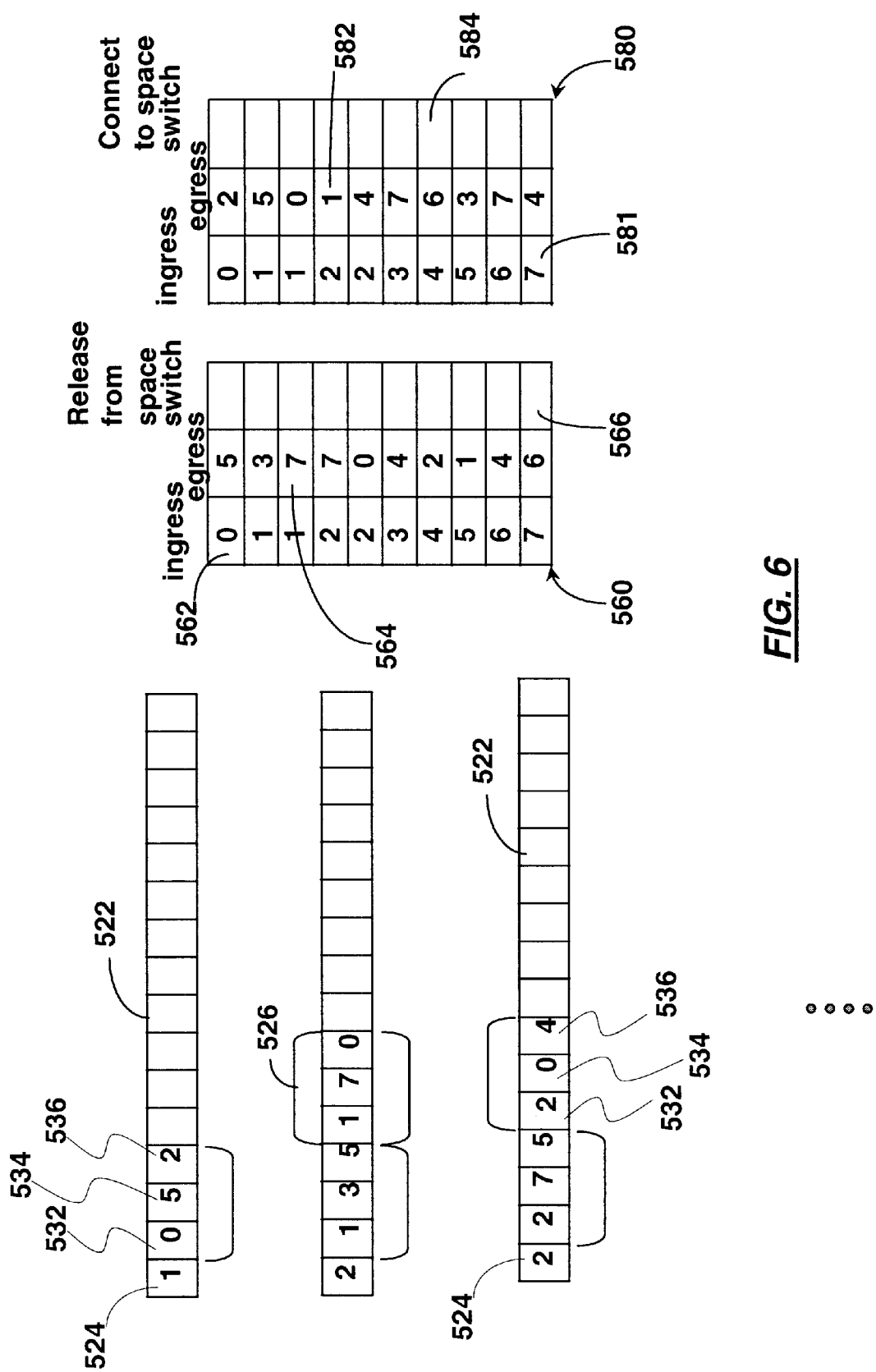
FIG. 6 is a schematic diagram of a data structure used by edge-module to request connectivity changes in the core modules of the switch architecture illustrated in FIGS. 1 and 2.
Figure 7:
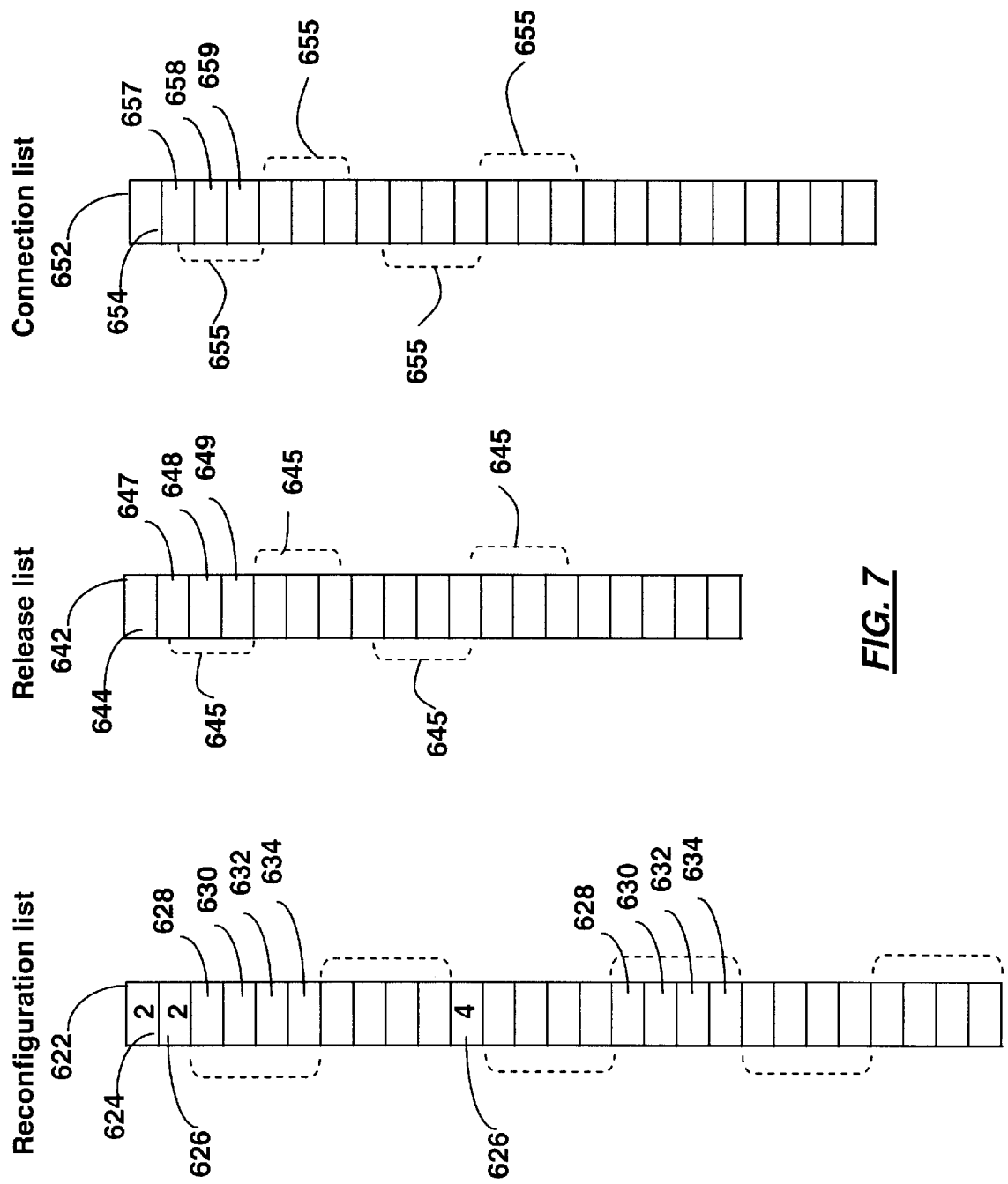
FIG. 7 is a schematic diagram illustrating the organization of configuration change requests at a core module and the format used by the core module to report a release list and connection list to the edge modules.

In order to select a space switch from which a connection is to be released, a release array 560 (FIG. 6) indicating the connections selected for release is matched with each of the M connectivity arrays 684. The number of resulting idle connections is determined. The space switch 103 that will have the highest vacancy after release of a respective subset of connections is selected. The connectivity array 684 of the selected space switch is removed from the list of connections to be released and the connection subset to be released is copied to the reconfiguration list 622 (FIG. 7). The process is repeated with the remainder of the release array 560 until all the releases are assigned to space switches 103. Reconfiguration list 622 (FIG. 7) is used to store all the release allocations.

The Connection Process

Array 692 (FIG. 8) stores the number of idle connections in each of the M space switches 103. Array 694 (FIG. 8) stores the vacancy of each space switch. Each space switch having a vacancy exceeding one is a candidate for receiving a connection. The assignment of connections to space switches 103 starts by attempting space switches with 2 idle connections, followed by space switches with higher vacancies in an ascending order. After all the connections are assigned to space switches, or when no further connections can be assigned, the connection assignment process is terminated. The lists of connection releases 642 (FIG. 7) and connection assignments 652 are merged in the reconfiguration list 622 (FIG. 7). Some entries in reconfiguration list 622 will only include releases. This occurs when an associated connection of a reconfiguration request can not be made. Other entries in the reconfiguration list 622 will only include connections, if the associated releases were implemented in a previous cycle.

As mentioned earlier, at least one connection from each ingress edge module 102 to each core module 302 should be kept as an idle connection that cannot be used for a committed connection. This is required to facilitate the reconfiguration process without having to rearrange a large number of connections, which can be time consuming. After each possible committed connection has been assigned, unassigned channels from ingress edge modules 102 and unassigned channels to egress edge modules 112 can be paired to form temporary connections (uncommitted connections) used for the transfer of connectionless traffic. It should be noted that during normal network operation, a significant proportion of connections may be idle. This significantly facilitates the reconfiguration process.

Effect of Switching Time

If switching time in the core modules is negligible, releases can be effected prior to new connections. Otherwise, new connections are considered first as will be explained below.

Fast Core Switching

Figure 9:
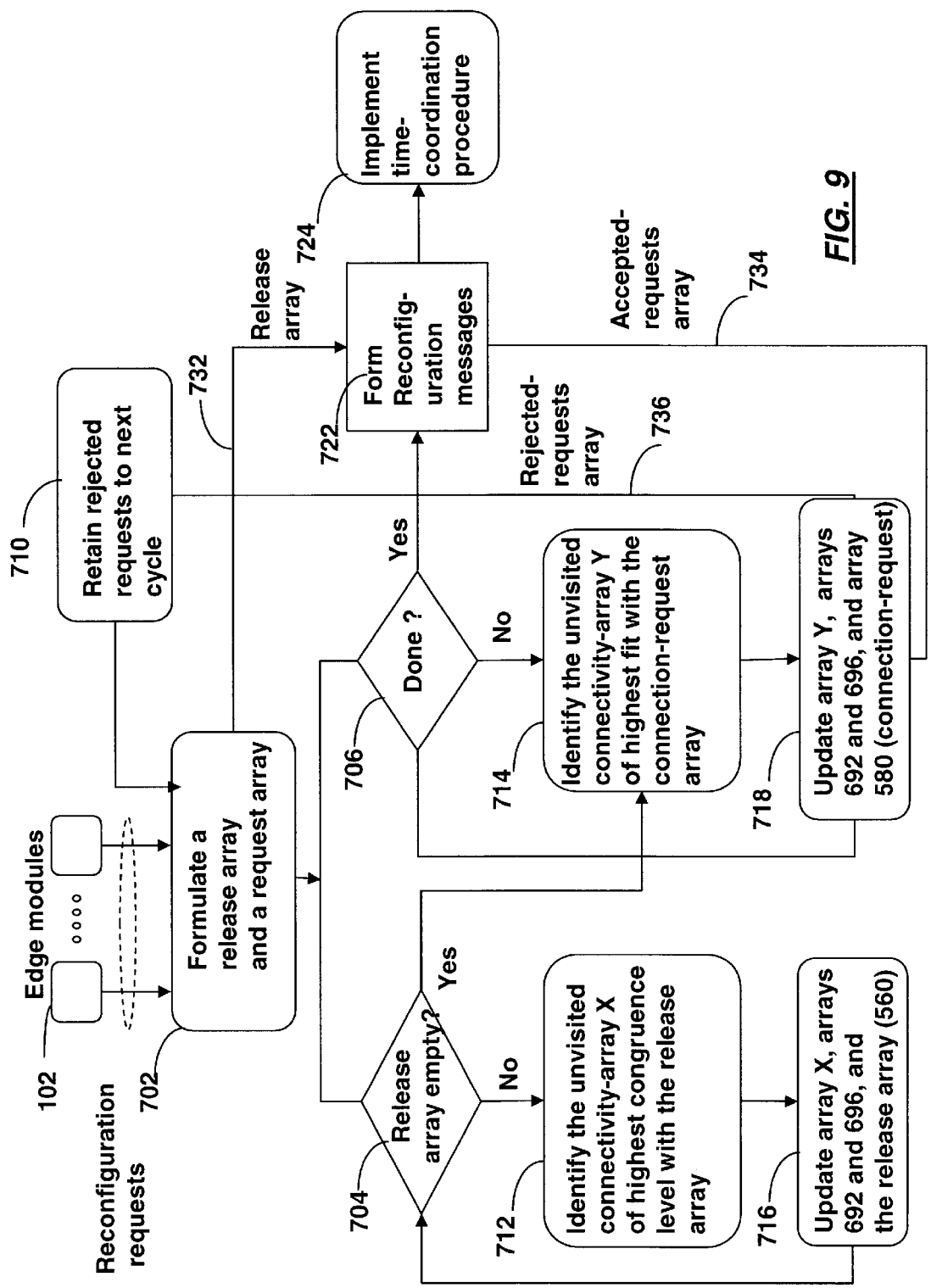
FIG. 9 is a flow chart of a process for determining core connectivity changes in a switch having negligible switching delay using adaptive-pattern packing.

A connection assignment process for a distributed switch 300 (FIG. 3) having a core modules 302 comprising parallel space switches with a negligible switching delay is described with reference to FIG. 9. A release array 560 and connection array 580 are formulated in step 702, using reconfiguration arrays 524 (FIG. 6) sent from the ingress edge modules 102. In step 704, the release array 560 is examined to determine if it is empty. If not, (step 712) a congruence level of the release array 560 and the connectivity array 684 (FIG. 8) of each space switch is determined and the connectivity array 684 with the highest congruence level is selected. In step 716, the congruent entries are deleted from the release array 560 and marked as vacant in the selected connectivity array 684. The process of steps 712 and 716 are repeated, excluding connectivity arrays 684 that have already been considered, and in each iteration looking for the space switch 103 having the connectivity array 684 with the highest congruence level with the remainder of the release array 560 (FIG. 6). When all the releases have been effected, step 704 directs the process to step 714 where an attempt to accommodate the connection requests is made.

In the connection process, space switches 103 having a vacancy of at least two idle connections are sorted in an ascending order of vacancy, starting with space switches 103 having at least 2 idle connections and proceeding to space switches with more than two idle connections. The space switches are then examined in ascending order of vacancy to determine what new connections listed in the connection array 580 (FIG. 6) can be assigned.

When the space switches of a vacancy of 2 are considered, the space switches that can accommodate two connections from the connection array 580 are selected first, followed by the space switches that can accommodate only one connection from the connection array 580.

This process proceeds by considering switches having a vacancy of 3 idle connections. An attempt is made to accommodate the remaining connections by first selecting space switches 103, of core module 302 undergoing a reconfiguration, that can accommodate three connections from the connection array 580. This is followed by considering space switches 103 that can accommodate two connections from the connection array 580. Thereafter, space switches are considered that can accommodate only one connection from the connection array 580.

Space switches with higher vacancies, if any, are used in the same fashion. The process continues in this manner by iterating steps 714 and 718 until no further progress can be made, as determined in step 706, because the connection array 580 is empty, or none of the connections remaining in the connection array 580 can be accommodated in the current connection scheduling cycle. If some of the connections in the connection array 580 cannot be accommodated, the remainder of the connection array 580 containing the unsuccessful connections is retained for processing during a subsequent connection assignment cycle.

The release list 642 (FIG. 7) is generated by the release process in steps 704, 712, and 716 and the connection list 652 (FIG. 7) is generated by the connection process in steps 706, 714, and 718. The release list 642 and connection list 652 are processed in step 722 in which reconfiguration messages are formulated to initiate the reconfiguration process.

Slow Core Switching

Figure 10:
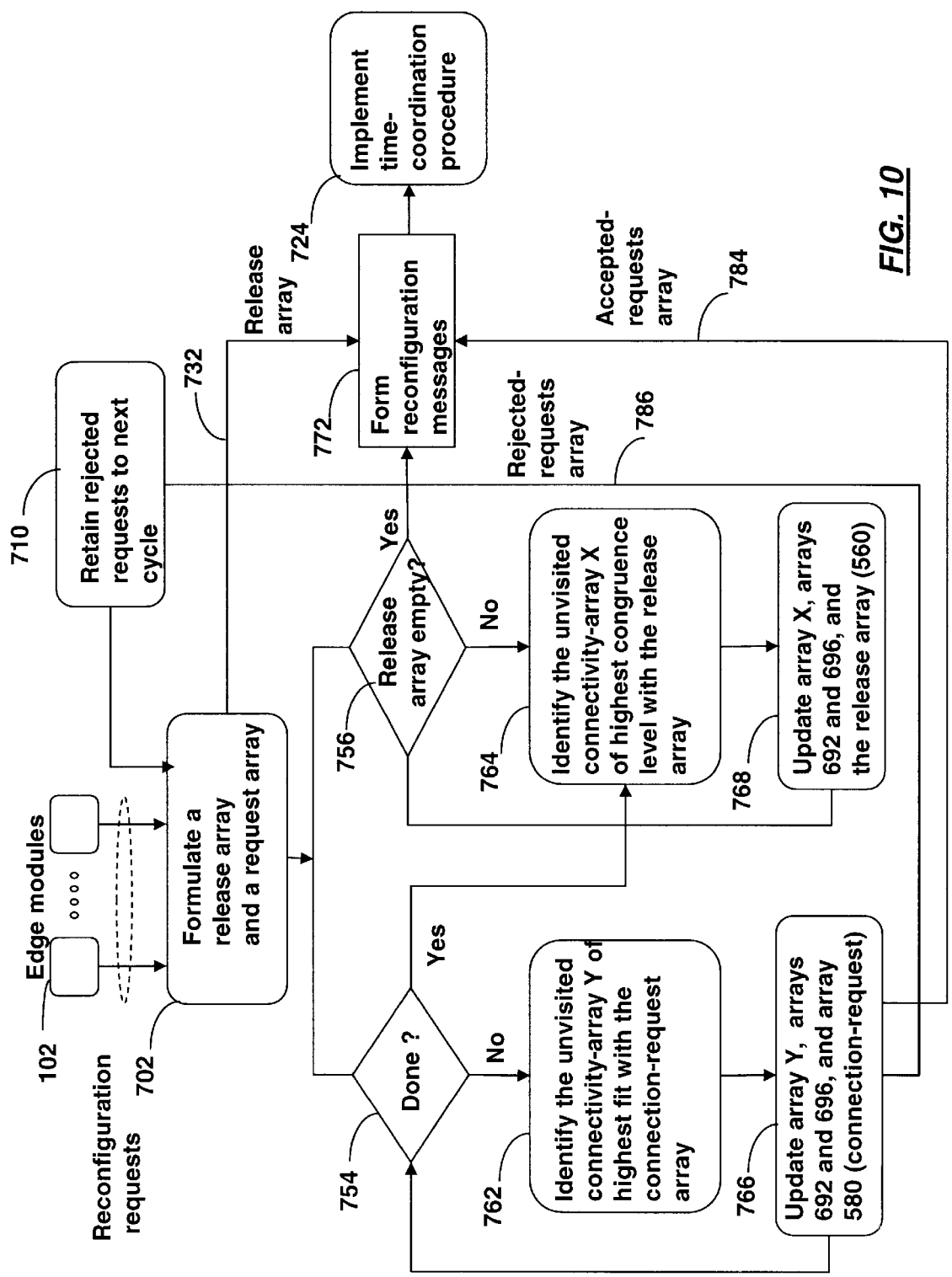
FIG. 10 is a flow chart of a process for determining core connectivity changes in a switch having a significant switching delay using adaptive-pattern packing.

FIG. 10 is a flow chart of a process used for connection release and assignment preparatory to core reconfiguration in a distributed switch 300 having core modules 302 with space switches 103 having a high switching latency. The release array 560 and connection array 580 are formulated in step 702 as described above with respect to FIG. 9. The establishment of new connections is executed first. Space switches 103 having a vacancy of at least two idle connections, as indicated by connectivity arrays 684 (FIG. 8), are sorted in an ascending order of vacancy.

The space switches with a vacancy of 2, having 2 idle connections, are considered first. Space switches that can accommodate two connections are selected first, followed by space switches that can accommodate only one connection.

The process then proceeds by considering connectivity arrays 684 for space switches having a vacancy of 3 idle connections. An attempt is first made to assign the remaining connections by selecting space switches that can accommodate three connections each. Space switches that can accommodate two connections each are considered second. Finally, space switches that can accommodate only one connection are considered. Space switches with higher vacancies, if any, are used in the same fashion. Thus, space switches of the same vacancy are differentiated according to the number of connection-requests that can be accommodated.

The process continues by iterating steps 762 and 766 until no further progress can be made, as determined in step 754. Further progress cannot be made when either the connection array is empty or none of the remaining in the connection array can be accommodated in the current scheduling cycle. In the latter case, the remainder of the connection array containing the connections that could not be assigned is retained for processing during a subsequent scheduling cycle.

The release process is then executed in such a way as to attempt to maximize an occupancy variance between the space switches in the core module 302. In step 764, the congruence level of the release array 560 and the connectivity array 684 of each space switch is determined and the connectivity array 684 with the highest congruence level is selected to begin the release process. In step 768, the congruent entries are deleted from the release array 560 and marked as idle in the selected connectivity array 684. The process of steps 764 and 768 are repeated, excluding connectivity arrays 684 for space switches that have already been considered for releases, and during each iteration determining a connectivity space switch with the highest congruence level with the remainder of the release array 560. When all the releases are effected, step 756 directs the process to step 772.

The release list 642 is generated in steps 764 and 768 by the release process, and the connection list 652 is generated in steps 754 and 766 by the connection process. The two lists are processed in step 772, where reconfiguration messages are formulated to initiate the reconfiguration process at the edge modules.

Unprotected Traffic

All connections are provisioned in units of a channel capacity. A channel capacity is typically of an order of 10 Gb/s. Data traffic without a guaranteed quality of service (unprotected traffic) can be transferred using excess capacity, if any, of committed connections The transfer of unprotected traffic using excess capacity of committed connections is controlled exclusively by the edge modules.

Idle-connection Assignment Policy

Under any traffic condition, each edge module has at least one idle channel connected to one of the space switches 103 in each core module. The total number, J, of idle channels emanating from an ingress edge module is at least equal to a number, C, of core modules 302 (FIG. 3). Similarly, a number, K, of idle channels terminating on an egress edge module is at least equal to the number C of core modules. The number J may be larger than the number K if channel multicast is supported.

A connection is made up of two channels, a first channel from an ingress edge module 102 to a designated core space switch 103, and a second channel from the designated core space switch 103 to an egress edge module 112. Idle channels from ingress edge modules 102 to a particular core module 302 and idle channels from the core module 302 to egress edge modules 112 can be paired to form uncommitted connections. As defined above, an uncommitted connection carries 'best-effort' traffic that is not given any quality-of-service guarantees. Thus, an uncommitted connection can be released if either of its channels is required to form a committed connection. The release process, however, must ensure that no data is lost. The reconfiguration procedure described above only establishes committed connections and treats the channels forming uncommitted connections as if they were idle channels. Once the reconfiguration of committed connections is completed, new idle channels are formed and some uncommitted connections may be terminated. Resulting idle channels may be paired again to form new uncommitted connections. The reconfiguration process at the ingress edge module is indifferent respecting the type of connection being established.

The ability to define the uncommitted connections depends largely on the spatial distribution of the idle channels. In one extreme, if all the channels to and from one of the space switch are idle, a permutation of connections from any ingress edge module 102 to any egress edge module 112 can be made. In the other extreme, if the idle channels are distributed uniformly among M space switches, with M≧N, so that there are at least N space switches each having one free ingress channel and one free egress channel, then only N specific uncommitted connections can be made. The reconfiguration procedure therefore attempts to broaden the variance in occupancy between the space switches 103 within each core module 302. Thus, when the reconfiguration is complete, a small number of space switches likely support most of the idle channels. This increases the probability of successfully establishing connections requested by the ingress edge modules.

Treatment of Unprotected Traffic

Each ingress edge module 102 may have several ingress ports (not shown), preferably of an order of 128. At each ingress port of an ingress edge module 102, the traffic is sorted into traffic streams (not shown), each of which corresponds to an egress edge module 112. Each traffic stream is assigned to a traffic stream queue. The traffic stream queues normally share a common memory. The management of the traffic stream queues includes packet-level scheduling and is governed by rules that are internal to each ingress edge module 102 and may differ from one ingress edge module to another. The ingress queues in each ingress edge module 102 may be split into two main categories. The first relates to rate-controlled protected traffic and the second relates to unprotected traffic with no quality of service guarantees. within each category, the traffic may be further separated into narrower classifications. Those classifications are not necessarily visible outside the ingress edge module. A traffic stream is defined only by an ingress/egress module pair. The composition of a traffic stream is determined by its ingress edge module. At least one output port of each ingress edge module carries only unprotected traffic and the access privilege to that port or ports is governed by rules internal to the ingress edge module. The controller of each ingress edge module determines the required capacity, expressed in units of channels, for each of its traffic streams and reports the required capacity to a respective core module. As explained above, the channels of each ingress edge module are divided among the core modules.

As noted above, an ingress edge module 102 has at least one channel to each of the core modules that can be assigned to carry unprotected traffic. The core reconfiguration procedure treats channels carrying unprotected traffic as if they were completely idle. When committed connections for protected traffic are assigned, the remaining idle channels in the core are paired to form new uncommitted connections that may differ from previously configured ones. If there are two or more idle input channels to a core module 302, the core module controller 406 (FIG. 4) attempts to maximize the number of uncommitted connections that match the requests received from the ingress edge modules 102. If there is only one idle input channel, then only one uncommitted connection can be made. With multiple core modules, a protocol is required for maximizing the utilization of the uncommitted connections. A preferred simple protocol requires each ingress edge module to broadcast its requirement for uncommitted connections to all core modules. Each core module grants an appropriate connection to a respective ingress edge module with a round-robin fairness.

Allocation of Uncommitted Connections

As described above, a part of the unprotected traffic may use excess capacity of committed connections. To serve any remaining unprotected traffic, each ingress edge module 102 generates a list of preferred uncommitted connections based on the spatial distribution of the remaining unprotected traffic. The preferred core module 302 for each entry in the list is determined using a preferred routing list identical to one used for the committed connections. If an ingress edge module 102 has a single idle channel to a given core module 302, the core module 302 can only support one uncommitted connection for that ingress edge module 102. Nonetheless, the ingress edge module 102 may identify several candidate uncommitted connections for each core module 302 and communicate the identities of such connections to a respective core module 302. Preferably, a rank indicative of the volume, or any other property, of the respective unprotected traffic should also be communicated to a respective core module. Each core module may then select the candidate uncommitted connections using the data it receives from all subtending ingress edge modules 102. The selection takes into account the rank of each candidate. The selection is then communicated by each core module 302 to the ingress edge modules 102. The reconfiguration process at the ingress edge modules combines both the committed and uncommitted connections. However, the committed and uncommitted connections are identified so that traffic with a guaranteed quality of service is not sent over an uncommitted connection.

Edge Reconfiguration

Figure 11:
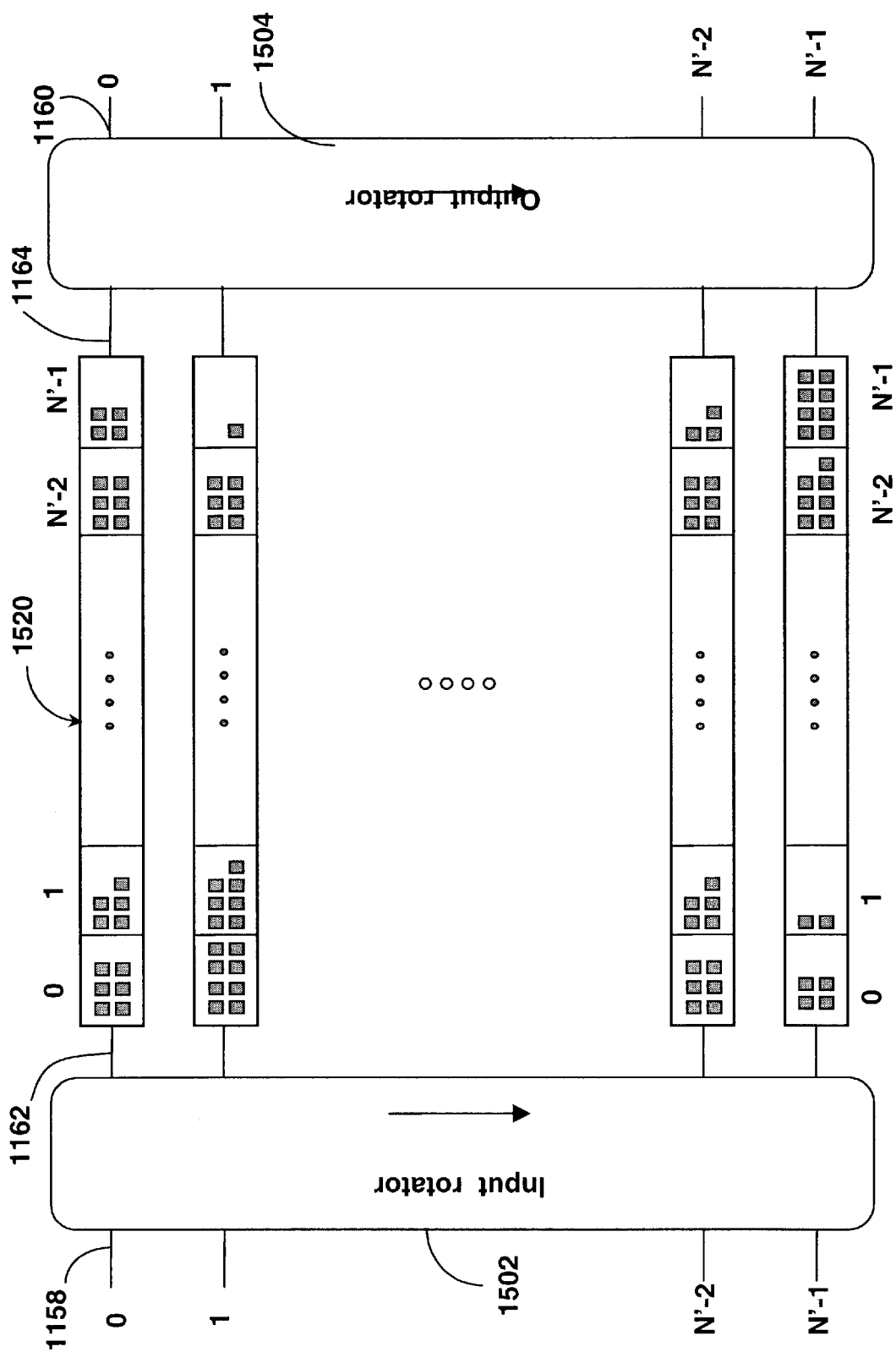
FIG. 11 is a schematic diagram illustrating an architecture of a rotator-based edge module.

FIG. 11 illustrates a preferred architecture for an edge module switch 102, 112 in accordance with the invention. The switch is preferably an electronic rotator switch as described in Applicant's co-pending United States Patent Application entitled RATE-CONTROLLED MULTI-CLASS HIGH-CAPACITY PACKET SWITCH which was filed on Feb. 4, 1999 and assigned Ser. No. 09/224,824, the specification of which is incorporated herein by reference. The edge module switch includes a plurality of ingress parts 1158 connected to an input rotator 1502, and an output rotator 1504 connected to a plurality of egress ports 1160. The ingress ports 1158 are connected to subtending data packet sources (not shown) and the egress ports 1160 are connected to subtending data packet sinks (not shown). The input rotator 1502 and the output rotator 1504 are respectively connected to a plurality of parallel middle memories 1520 by inner links 1162 and 1164 in a manner explained in detail in Applicant's co-pending patent application. Both ingress ports 1158 and egress ports 1160 have packet queues (not shown).

Figure 12:
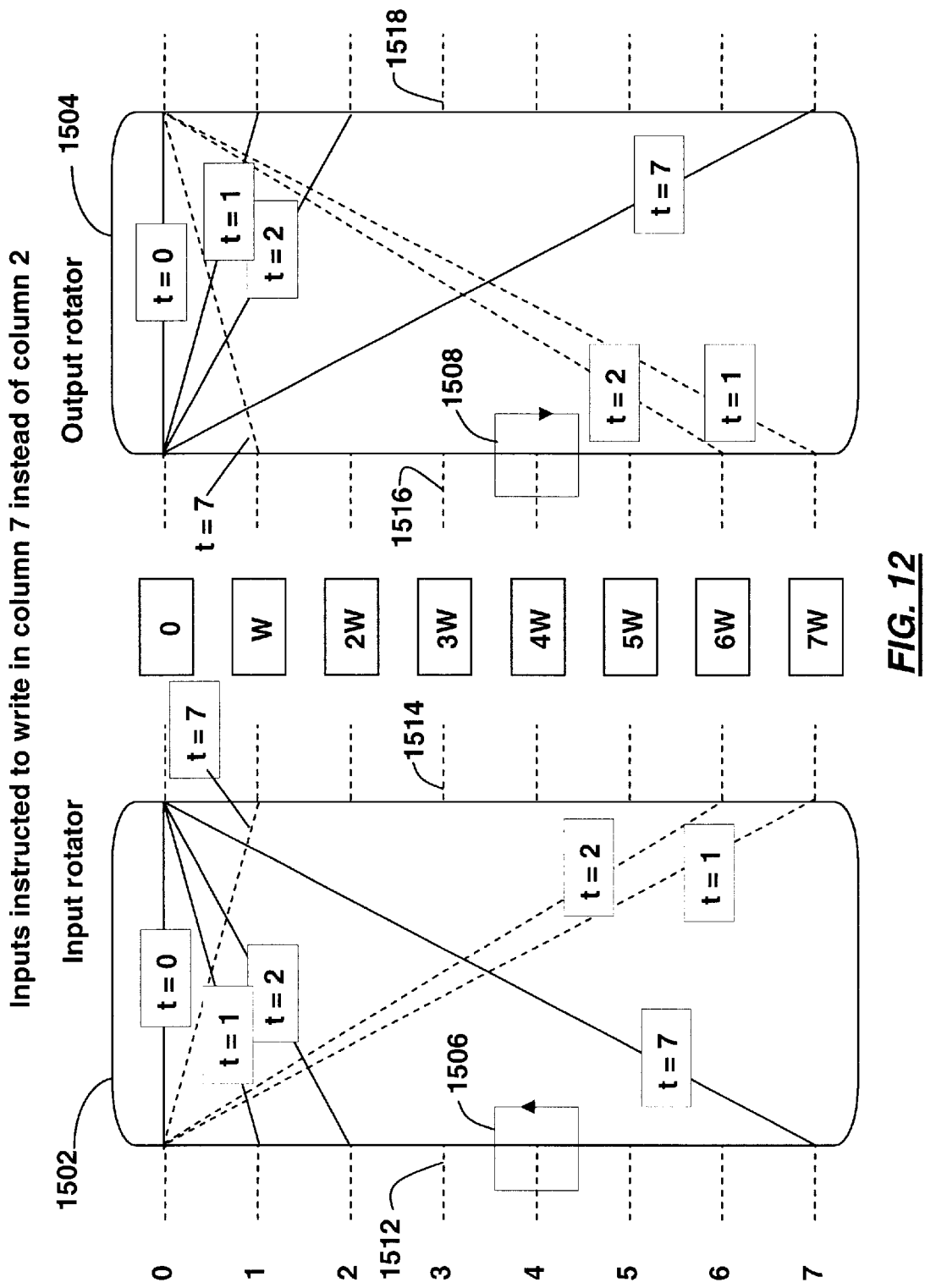
FIG. 12 is a schematic diagram illustrating relative timing of the connectivity of the rotator-based edge module shown in FIG. 11.
Figure 13:
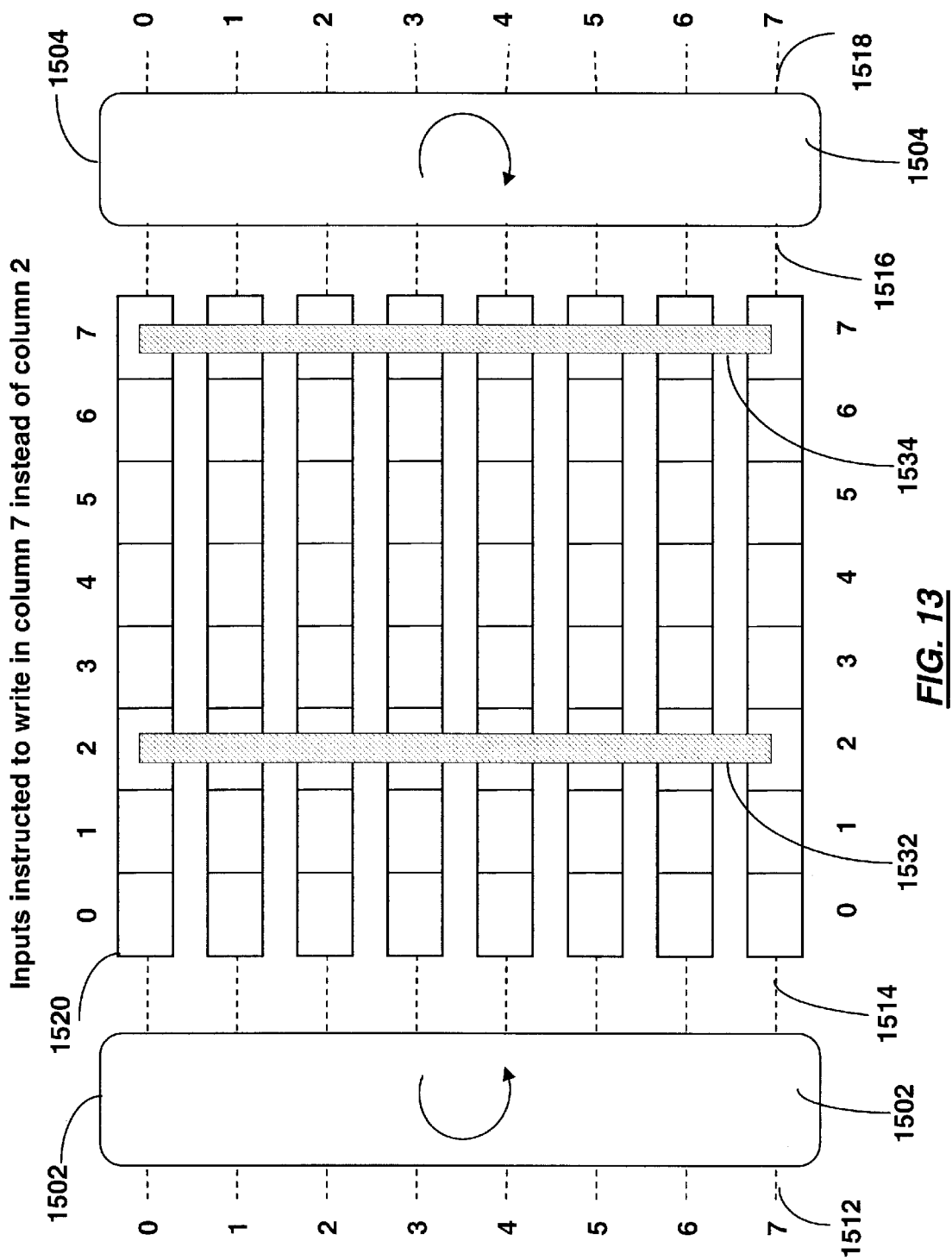
FIG. 13 is a schematic diagram illustrating the reconfiguration at an ingress edge module.

FIG. 12 illustrates the relative timing of input rotator 1502 and output rotator 1504 in an 8×8 port high-capacity packet switch 102, 112. The arrows 1506 and 1508 indicate a direction of rotation of the respective rotators. An input port 1512 of input rotator 1502 connects to a correspondingly numbered output port 1514 of the same rotator at cyclic time t=0. The cyclic time period equals the number of input ports of the rotator times a memory access duration "d". The memory access duration is a time period during which an input port 1512 of input rotator 1502 writes data units to a middle memory 1520. An input port 1516 also connects to an output port 1518 of an output rotator 1504 during the memory access time of duration "d".

FIG. 12 also illustrates the connectivity of input port "0", indicated by reference number 1512, to the respective output ports 1514 (0, . . . 7) during a rotator cycle. Given the counter-clockwise rotation indicated by arrow 1506, input "of" of rotator 1502 is connected respectively to output ports "0", "7", "6", "5", "4", "3", "2", and "1" during access intervals 0 to 7. Arrow 1508 indicates the clockwise rotation of the output rotator 1504. Likewise, for the output rotator 1504, the input port "0" (reference 1516) is connected respectively to output ports "0", "1", . . . , "7", during access intervals 0 to 7.

Each output port 1514 of input rotator 1502 writes data units (the amount of data transferred during an access interval) to a middle memory 1520 during each access interval. Each access interval is split into roughly equal write and read periods. Each input port 1516 of output rotator 1504 subsequently reads the data units from the middle memories 1520 during the rotator cycle. During each access interval, the read address for the middle memories 1520 is advanced by a predetermined data unit width "W". The value of "W" is a design parameter determined by the amount of data to be written to, and read from, a middle memory 1520 during an access interval "d". The values indicated by reference numeral 1522 represent the read addresses of respective middle memories 1520 at the beginning of a rotator cycle (t=0). The write addresses of the middle memories 1520 are determined by the input ports 1512 of the input rotator 1502. This timing pattern is used to determine middle memory access restrictions during a rotator cycle prior to a reconfiguration of the ingress edge module 102, as will be explained in more detail with reference to FIG. 19.

The time at which an ingress edge module 102 must reconfigure to conform with changes in connectivity in the core is dictated by a controller 406 of an associated core module 302 (FIG. 4). The reconfiguration period is likely to be significantly longer than the rotator cycle, An edge module must, however, implement its reconfiguration at a boundary of an access interval. The access interval is typically of an order of a fraction of a microsecond.

When an input port 1512 writes a data unit to the middle memories 1520, the data unit is not read from the middle memories 1520 for a period of time ranging from half an access interval to almost a full rotator cycle. Consequently, under a "steady state" condition between core reconfigurations, in which the input to output connectivity of an ingress edge module 102 remains unchanged, data units are read from the middle memories 1520 by the input ports 1516 of the output rotator up to nearly a full rotator cycle after they are written. When a reconfiguration of the ingress edge module must be performed to conform to changes in the core, however, it is imperative that data units not be written to a middle memory if they cannot be read from the middle memory by the intended output before reconfiguration. Otherwise, the data units in the middle memories may be sent to the wrong input port 1516 of the output rotator 1504. The latency between the writing of a data unit to the middle memories 1520 and the reading of the data unit from the middle memories, is dependent on a spatial relationship between the output port 1514 of the input rotator 1502 and the input port 1516 of the output rotator 1504. Consequently, an output port 1514 can only write a data unit to the middle memories if enough time remains before reconfiguration for the data unit to be read by the intended output port 1518. This timing issue is explained below in more detail.

Figure 14:
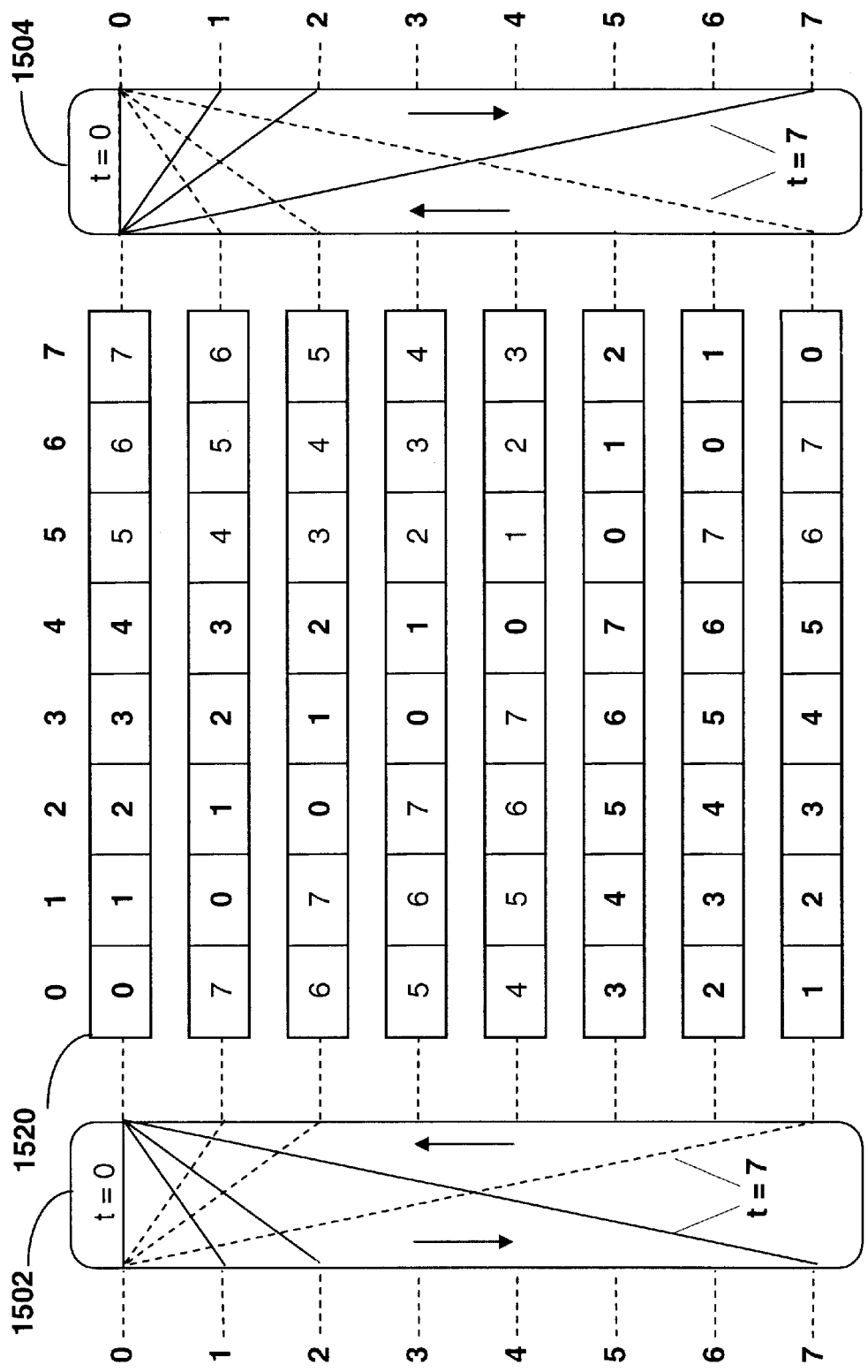
FIG. 14 is a schematic diagram illustrating a memory access timing discipline applied during a reconfiguration of the edge module shown in FIG. 13.

FIG. 14 illustrates the process of reconfiguration in a rotator-based switch. The column 1532 represents data written by an output port 1514 of the input rotator 1502. The data written to column 1532 is destined for the output port "2" (reference 1518) of the output rotator 1504. Output port "2" only transfers data read from column 2 of each middle memory 1520. A reconfiguration command received from a core module 302 (FIG. 4) directs the ingress edge module 102 to switch output from port "2" to port "7". The input rotator responds to the command by changing the write address from 2 to 7 for the input port currently writing to column 2. This is a simple control operation in a rotator-based switch.

FIG. 14 illustrates a limitation imposed on each input port 1512 that is writing to an output port 1518 during a changeover phase immediately prior to reconfiguration. The numbers shown in arrays 1520, represent cyclical time slots (the cycle being 8 for an 8×8 switch) at which an input port 1512 or an output port 1518 is accessing the respective memory to respectively write and read. If an output port 1518 (X) is to change connectivity during a core reconfiguration, the incumbent input port 1512 (j) can only write to the output port (X) during cyclical time slots 0 to [N'−1+j−X] modulo N', N' being the number of ports of either rotator.

For example, if input port 7 (j=7) is connected to output port 4 (X=4), then during a changeover cycle, input port 7 can only write to output port 4 during time slots 0 to [8−1+7−4], i.e., 0 to [10], i.e., 0 to 2. To illustrate this, by comparing the contents of column 7 and column 4, it is apparent that each entry in column 7 (when the input port 7 writes) is respectively less than a corresponding entry in column 4 (when the output port 4 reads) only at time slots 0, 1, and 2. Writing must precede reading during the changeover cycle, otherwise, the data written may be overwritten by the new input port connected to output port X by the reconfiguration process.

Reconfiguration

Reconfiguration of the core modules 302 is governed by the ingress edge modules 102, which request changes in connectivity based on dynamic traffic pattern changes. The ingress edge modules 102 constantly monitor traffic stream buffers and request new connections when traffic volumes warrant. Likewise, unused links are released to permit other ingress edge modules 102 to use the core resources, if required. As explained above, each ingress edge module refers to a preferred routing list that indicates the particular core module 302 to which a request for changes in connectivity and connection releases are sent. Requests may be sent from the ingress edge modules at any time, although the core modules 302 can only reconfigure in accordance with a predetermined schedule.

Although the requests for connection releases and changes in connectivity are generated by the ingress edge modules 102 and the core modules 302 reconfigure only in response to those requests, the core controller determines autonomously what reconfiguration occurs based On one of the algorithms described above. After the core module 302 has determined the reconfigured connectivity of core switches it controls, reconfiguration messages are sent to each of the respective ingress edge module controllers informing the controller of a time when reconfiguration of the core will occur.

In order to ensure successful transition through a reconfiguration, it is critical that all ingress edge modules 102 pause for a relatively-short period (a fraction of a microsecond should suffice) at the time of reconfiguration of a core module 302. The pause period is determined by a timing-discrepancy allowance (a fraction of a microsecond) and source-edge-module reconfiguration delay (for example, a 100 nanoseconds). If core-switching-latency masking is not applied, the core switching delay must also be added to the pause period (guard time). Due to propagation delays, relative times must be used to govern reconfiguration coordination. Consequently, each edge module controller has a timing circuit that includes time counters synchronized to the relative times of each core module controller. In the distributed switch 300 shown in FIG. 4, each edge module controller includes four time counters, one for each core module 302. A timing packet is periodically sent from each core module controller 406 to ensure that the time counters in the edge module controllers are synchronized. Timing coordination in a distributed switch is explained in detail in Applicant's co-pending U.S. patent application Ser. No. 09/286,431 entitled SELF-CONFIGURING DISTRIBUTED SWITCH which was filed on Apr. 6, 1999, the specification of which is incorporated herein by reference.

The agile optical-core distributed packet switch in accordance with the invention provides a self-governing switch that dynamically adapts to changes in traffic loads. Control is exercised from edge modules that determine how core connectivity is to be arranged by requesting changes to the connectivity in the core. Core modules operate autonomously to effect the requested changes in a manner that maximizes reconfiguration flexibility while ensuring that as many requests are honored as possible.

Changes and modifications to the preferred embodiments of the invention will no doubt become apparent to persons skilled in the art. The scope of the invention is therefore intended to be limited solely by the scope of the appended claims.

We claim:

1. An agile optical-core, distributed packet switch, comprising:
   a plurality of slow-switching core modules, each of the core modules including a plurality of optical space switches;
   a plurality of fast-switching edge modules connected to the core modules by a number of inner channels and connected to subtending packet sources and subtending packet sinks by a number of outer channels; and
   a controller associated with each core module, the controller instructing the fast-switching edge modules to switch from unused inner channels to respective new inner channels reconfigured in the core module, thereby masking switching latency of the slow-switching core modules without interrupting data transfer from the source edge-modules.

2. An agile optical-core distributed packet switch as claimed in claim 1 wherein each core module comprises a plurality of parallel optical space switches.

3. An agile optical-core distributed switch as claimed in claim 1 wherein, in response to a reconfiguration request, the controller cannot assign a new channel from a source edge module to an optical space switch supporting a channel to be released from the same edge module in response to the same reconfiguration request.

4. An agile optical-core distributed switch as claimed in claim 1 wherein the number of inner channels is greater than the number of outer channels.

5. An agile optical-core distributed packet switch as claimed in claim 4 wherein each edge module is connected by at least one inner channel to each optical space switch of each core module.

6. An agile optical-core distributed packet switch as claimed in claim 5 wherein at least one inner channel connecting each edge module to each core module is an idle inner channel used to facilitate reconfiguration of the core module.

7. An agile optical-core distributed packet switch as claimed in claim 1 wherein:
   each edge module has a plurality of ingress ports, each of the ingress ports having an associated ingress queue; and
   an ingress scheduler sorts packets arriving in the ingress queues from the subtending packet sources, the sort being by egress edge module from which the respective packets are to egress from the switch for delivery to the subtending packet sinks.

8. An agile optical-core distributed packet switch as claimed in claim 7 wherein:
   the ingress scheduler periodically determines a number of packets waiting in the ingress queues for each respective ingress edge module and a controller of the ingress edge module sends reconfiguration request messages to the controllers of the core modules as the number of waiting packets fluctuates; and
   a reconfiguration request message sent to a given controller of a core module is determined by a preferred routing table available to the controller of the ingress edge module.

9. An agile optical-core distributed packet switch as claimed in claim 1 wherein the core modules and the edge modules are spatially distributed.

10. An agile optical-core distributed packet switch as claimed in claim 9 wherein one edge module is co-located with each core module, and the edge module serves as a controller and hosts processors for the core module.

11. An agile optical-core distributed packet switch as claimed in claim 10 wherein each ingress edge module has a reconfiguration timing circuit for each core module, each of the reconfiguration timing circuits being time-coordinated with a time counter in the respective edge modules that host processors for the core modules, to coordinate data transfer from the ingress edge modules when the core modules are reconfigured to change connectivity.

12. An agile optical-core distributed packet switch, comprising:
   a plurality of distributed core modules, each core module including a plurality of parallel optical space switches; and a plurality of distributed fast-switching ingress edge modules, each ingress edge module having a plurality of ingress ports for receiving payload traffic from subtending sources via outer channels and a plurality of egress ports for transferring payload traffic to the core modules via a plurality of inner channels;

a plurality of distributed egress edge modules having a plurality of ingress ports for receiving payload traffic from the core modules via inner channels and a plurality of egress ports for transferring the payload traffic to subtending sinks via outer channels; and a controller associated with each core module, the controller instructing the fast-switching edge modules to switch from unused inner channels to respective new inner channels reconfigured in the core module, without interrupting data transfer from the source edge-modules.

13. The agile optical-core distributed packet switch, as claimed in claim 12 wherein the number of inner channels is greater than the number of outer channels to provide idle inner channels for facilitating reconfiguration of the core modules.

14. An agile optical-core distributed packet switch as claimed in claim 12 wherein the optical space switches in the core modules are slow-switching space switches, and during reconfiguration of the core the controller forms new connections using idle channels in a first reconfiguration cycle and replaces connections released in favor of the new connections in a subsequent reconfiguration cycle.

15. An agile optical-core distributed packet switch as claimed in claim 12 wherein the controller effects connection changes in response to a reconfiguration request in different space switches belonging to the same core module.

16. An agile optical-core distributed packet switch as claimed in claim 12 wherein switching delay in the optical space switches is negligible, and during reconfiguration of the space switches in the core, the inner channels are released and new connections are made during a single reconfiguration cycle.

17. The agile optical-core distributed packet switch as claimed in claim 16 wherein respective edge modules must pause and interrupt data transfer during a period of time exceeding the negligible switching delay of the space switches in the plurality of core modules.

18. An agile optical-core distributed packet switch as claimed in claim 12 wherein during a connection assignment process in preparation for a reconfiguration of a core module, connections are assigned in a process that starts from a reference space switch and proceeds in a predetermined order to the other space switches, whereas connection releases are processed in an exactly opposite order.

19. An agile optical-core distributed packet switch as claimed in claim 12 wherein during a connection assignment process in preparation for a reconfiguration of a core module, connections are assigned by a process in which an array indicating an occupancy of each of the optical space switches in the core module is sorted in an order of occupancy, and the connections are assigned in an order beginning from a most occupied optical space switch and proceeding to a least occupied optical space switch, whereas connection releases are processed in an exactly opposite order.

20. An agile optical-core distributed packet switch as claimed in claim 19 wherein the occupancy of a space switch is defined as the number of active ports before reconfiguration releases are effected.

21. An agile optical-core distributed packet switch as claimed in claim 19 wherein the occupancy of a space switch is defined as the number of active ports after reconfiguration releases are effected.

22. An agile optical-core distributed packet switch as claimed in claim 13 wherein the idle inner channels are used to form uncommitted connections for transferring data traffic from the subtending sources to the subtending sinks without a guaranteed quality of service.

23. An agile optical-core distributed packet switch as claimed in claim 22 wherein the uncommitted connections are concatenated from an idle inner channel from an ingress edge module to the core module and an idle inner channel from the core module to an egress edge module to form the uncommitted connection.

24. An agile optical-core distributed packet switch as claimed in claim 19 wherein the uncommitted connection is assigned by the controller based on lists of preferred uncommitted connections sent to the controller from the ingress edge modules.

25. An agile optical-core distributed packet switch as claimed in claim 22 wherein the core module controller assigns the uncommitted connections in a round robin discipline to enhance fairness.

26. An agile optical-core distributed packet switch as claimed in claim 22 wherein the core module controller appropriates any uncommitted connection to assign a committed connection during any reconfiguration cycle in which the committed connection is required, without regard to an identity of data traffic being transferred on the uncommitted connection.

27. An agile optical-core distributed packet switch as claimed in claim 12 wherein a selection of space switches for reconfiguration increases a variance in an occupancy of the respective optical space switches in a core module.

28. An agile optical-core distributed packet switch as claimed in claim 27 wherein the occupancy of the respective optical space switches in a core module is based on a count of committed connections.

29. An agile optical-core distributed packet switch as claimed in claim 28 wherein a selection of space switches for reconfiguration releases is based on a maximum vacancy congruence between a release list and a respective connectivity array for each of the optical space switches in a core module.

30. An agile optical-core distributed packet switch as claimed in claim 28 wherein a selection of space switches for reconfiguration of connections is based on a preference for optical space switches in the core module that are least occupied.

31. A method of channel switching data packet streams received on inner links from fast-switching edge modules using optical space switches in a core module of a geographically distributed packet switch, comprising the steps of:

using uncommitted connections in the optical space switches to configure new connections in the optical space switches in response to reconfiguration requests received from the fast-switching edge modules; and instructing the fast-switching edge modules to switch from unused inner channels to the new connections reconfigured in the core module, without interrupting data transfer from the source edge-modules.

32. A method as claimed in claim 31 wherein the optical space switches in the core modules are slow-switching space switches, and during reconfiguration of the core the controller forms new connections using idle channels in a first reconfiguration cycle and replaces connections released in favor of the new connections in a subsequent reconfiguration cycle.

33. A method as claimed in claim 31 wherein the controller effects connection changes effected in response to the reconfiguration requests in different space switches belonging to the same core module.

34. An agile optical-core distributed packet switch as claimed in claim 31 wherein switching delay in the optical space switches is negligible, and during reconfiguration of the space switches in the core, the inner channels are released and new connections are made during a single reconfiguration cycle.

35. The agile optical-core distributed packet switch as claimed in claim 34 wherein respective edge modules must pause and interrupt data transfer during a period of time exceeding the negligible switching delay of the space switches in the plurality of core modules.

36. A method as claimed in claim 31 wherein during a connection assignment process in preparation for a reconfiguration of a core module, connections are assigned in a process that starts from a reference space switch and proceeds in a predetermined order to the other space switches, whereas connection releases are processed in an exactly opposite order.

37. A method as claimed in claim 31 wherein during a connection assignment process in preparation for a reconfiguration of a core module, connections are assigned by a process in which an array indicating an occupancy of each of the optical space switches in the core module is sorted in an order of occupancy, and the connections are assigned in an order beginning from a most occupied optical space switch and proceeding to a least occupied optical space switch, whereas connection releases are processed in an exactly opposite order.

38. A method as claimed in claim 37 wherein the occupancy of a space switch is defined as the number of active ports before reconfiguration releases are effected.

39. A method as claimed in claim 37 wherein the occupancy of a space switch is defined as the number of active ports after reconfiguration releases are effected.

40. A method as claimed in claim 32 wherein the idle inner channels are used to form uncommitted connections for transferring data traffic from the subtending sources to the subtending sinks without a guaranteed quality of service.

41. A method as claimed in claim 40 wherein the uncommitted connections are concatenated from an idle inner channel from an ingress edge module to the core module and an idle inner channel from the core module to an egress edge module to form the uncommitted connection.

42. A method as claimed in claim 40 wherein the uncommitted connection is assigned by the controller based on lists of preferred uncommitted connections sent to the controller from the ingress edge modules.

43. A method as claimed in claim 42 wherein the core module controller assigns the uncommitted connections in a round robin discipline to enhance fairness.

44. An agile optical-core distributed packet switch as claimed in claim 40 wherein the core module controller appropriates any uncommitted connection to assign a committed connection during any reconfiguration cycle in which the committed connection is required, without regard to an identity of data traffic being transferred on the uncommitted connection.

45. A method as claimed in claim 37 wherein a selection of space switches for reconfiguration increases a variance in an occupancy of the respective optical space switches in a core module.

46. A method as claimed in claim 45 wherein the occupancy of the respective optical space switches in a core module is based on a count of committed connections.

47. A method as claimed in claim 46 wherein a selection of space switches for reconfiguration releases is based on a maximum vacancy congruence between a release list and a respective connectivity array for each of the optical space switches in a core module.

48. A method as claimed in claim 37 wherein a selection of space switches for reconfiguration of connections is based on a preference for optical space switches in the core module that are least occupied.

* * * * *

UNITED STATES PATENT AND TRADEMARK OFFICE
CERTIFICATE OF CORRECTION

PATENT NO. : 6,486,983 B1
DATED : November 26, 2002
INVENTOR(S) : Maged E. Beshai et al.

It is certified that error appears in the above-identified patent and that said Letters Patent is hereby corrected as shown below:

Column 1,
Line 5, after the title to the patent, insert,
-- STATEMENT REGARDING FEDERALLY SPONSORED RESEARCH OR DEVELOPMENT
This invention was made with Government support under Technology Investment Agreement F30602-98-2-0194 awarded by the Air Force. The Government has certain rights in this invention. --

Signed and Sealed this

Twenty-sixth Day of July, 2005

JON W. DUDAS
*Director of the United States Patent and Trademark Office*